(12) United States Patent
Tomioka

(10) Patent No.: US 12,050,311 B2
(45) Date of Patent: Jul. 30, 2024

(54) VARIABLE MAGNIFICATION OPTICAL SYSTEM AND IMAGING APPARATUS

(71) Applicant: FUJIFILM Corporation, Tokyo (JP)

(72) Inventor: Ukyo Tomioka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 23 days.

(21) Appl. No.: 17/729,642

(22) Filed: Apr. 26, 2022

(65) Prior Publication Data

US 2022/0308326 A1     Sep. 29, 2022

Related U.S. Application Data

(63) Continuation of application No. PCT/JP2020/038809, filed on Oct. 14, 2020.

(30) Foreign Application Priority Data

Oct. 29, 2019   (JP) .................................. 2019-196725

(51) Int. Cl.
*G02B 17/08*     (2006.01)
*G02B 15/14*     (2006.01)
(52) U.S. Cl.
CPC .................... *G02B 17/0808* (2013.01); *G02B 15/145127* (2019.08); *G02B 17/0896* (2013.01)
(58) Field of Classification Search
CPC .......... G02B 15/145127; G02B 15/167; G02B 17/0808; G02B 17/0896
See application file for complete search history.

(56) References Cited

U.S. PATENT DOCUMENTS

| 4,971,428 A | 11/1990 | Moskovich |
| 5,940,222 A | 8/1999 | Sinclair et al. |
| 2005/0259330 A1 | 11/2005 | Neil |
| 2017/0293121 A1 | 10/2017 | Kawamura |
| 2018/0188511 A1* | 7/2018 | Yonezawa ...... G02B 15/144109 |
| 2019/0265449 A1* | 8/2019 | Cho .................... G02B 27/0025 |

FOREIGN PATENT DOCUMENTS

| JP | H11-202208 A | 7/1999 |
| JP | 2017-187640 A | 10/2017 |
| JP | 2019-148791 A | 9/2019 |

OTHER PUBLICATIONS

International Search Report issued in PCT/JP2020/038809; mailed Dec. 15, 2020.
Written Opinion of the International Searching Authority issued in PCT/JP2020/038809; mailed Dec. 15, 2020.

* cited by examiner

*Primary Examiner* — Marin Pichler
*Assistant Examiner* — Justin W. Hustoft
(74) *Attorney, Agent, or Firm* — Studebaker & Brackett PC

(57) ABSTRACT

A variable magnification optical system includes, in order from the object side along the optical path, a first group that has a positive power, a second group that has a positive power, a third group that has a negative power, a stop, a fourth group that has a positive power, and a fifth group that has a positive power. The first group includes two mirrors. An intermediate image is formed in the optical path between the first group and the second group. The second group, the third group, and the fourth group are refractive optical systems. During changing magnification, the two mirrors of the first group, the second group, the stop, and the fifth group are immovable, the third group moves to the image side, and the fourth group moves to the object side.

28 Claims, 17 Drawing Sheets

VARIABLE MAGNIFICATION OPTICAL SYSTEM AND IMAGING APPARATUS

CROSS-REFERENCE TO RELATED APPLICATIONS

This application is a continuation application of International Application No. PCT/JP2020/038809, filed on Oct. 14, 2020, which is incorporated herein by reference in its entirety. Further, this application claims priority from Japanese Patent Application No. 2019-196725, filed on Oct. 29, 2019. Each application above is hereby expressly incorporated by reference, in its entirety, into the present application.

BACKGROUND

Technical Field

The technique of the present disclosure relates to a variable magnification optical system and an imaging apparatus.

Related Art

As a catadioptric variable magnification optical system, an optical system described in JP1999-202208A (JP-H11-202208A) is known.

In recent years, there has been a demand for a catadioptric variable magnification optical system that has more favorable optical performance and can be reduced in size.

SUMMARY

In view of the above-mentioned circumstances, the technique of the present disclosure has an object to provide a catadioptric variable magnification optical system that has more favorable optical performance and can be reduced in size, and an imaging apparatus comprising the variable magnification optical system.

According to an aspect of the technique of the present disclosure, there is provided a variable magnification optical system comprising: as groups having powers, only five groups consisting of, in order from an object side to an image side along an optical path, a first group that has a positive power, a second group that has a positive power, a third group that has a negative power, a fourth group that has a positive power, and a fifth group that has a positive power. The first group is an optical element that has a power positioned closest to the object side on the optical path, and includes a first mirror that has a concave reflective surface facing toward the object side and a second mirror that reflects light, which is directed from the first mirror toward the object side, toward the image side and that has a convex reflective surface facing toward the image side, an intermediate image is formed in the optical path between the first group and the second group, the second group, the third group, and the fourth group are refractive optical systems, a stop is disposed between the third group and the fourth group, and during changing magnification from a wide angle end to a telephoto end, the first mirror, the second mirror, the second group, the stop, and the fifth group remain stationary with respect to an image plane, the third group moves to the image side, and the fourth group moves to the object side.

In the variable magnification optical system of the above-mentioned aspect, it is preferable that the first group remains stationary with respect to the image plane during changing magnification. Assuming that a focal length of the variable magnification optical system at the telephoto end is fT, and a focal length of the first group is f1, it is preferable to satisfy Conditional Expression (1), and it is more preferable to satisfy Conditional Expression (1-1).

$$0.5 < |fT/f1| < 4 \tag{1}$$

$$1 < |fT/f1| < 2.5 \tag{1-1}$$

In the variable magnification optical system of the above-mentioned aspect, it is preferable that the first group remains stationary with respect to the image plane during changing magnification. Assuming that a lateral magnification of the second group in a state in which an infinite distance object is in focus is β2, it is preferable to satisfy Conditional Expression (2), and it is more preferable to satisfy Conditional Expression (2-1).

$$-2 < \beta 2 < -0.5 \tag{2}$$

$$-1.5 < \beta 2 < -1 \tag{2-1}$$

In the variable magnification optical system of the above-mentioned aspect, assuming that a focal length of the third group is f3, and a focal length of the fourth group is f4, it is preferable to satisfy Conditional Expression (3), and it is more preferable to satisfy Conditional Expression (3-1).

$$-2 < f3/f4 < -0.1 \tag{3}$$

$$-1 < f3/f4 < -0.5 \tag{3-1}$$

In the variable magnification optical system of the above-mentioned aspect, it is preferable that the fourth group includes a biconvex lens that is disposed closest to the object side and a cemented lens that is disposed closer to the image side than the biconvex lens and formed by cementing two lenses including a positive lens and a negative lens.

In the variable magnification optical system of the above-mentioned aspect, assuming that in a state in which an infinite distance object is in focus, a lateral magnification of the third group at the telephoto end is β3T, and a lateral magnification of the third group at the wide angle end is β3W, it is preferable to satisfy Conditional Expression (4), and it is more preferable to satisfy Conditional Expression (4-1).

$$1 < \beta 3T/\beta 3W < 5 \tag{4}$$

$$1.2 < \beta 3T/\beta 3W < 3.5 \tag{4-1}$$

In the variable magnification optical system of the above-mentioned aspect, assuming that in a state in which an infinite distance object is in focus, a lateral magnification of the fourth group at the telephoto end is β4T, and a lateral magnification of the fourth group at the wide angle end is β4W, it is preferable to satisfy Conditional Expression (5), and it is more preferable to satisfy Conditional Expression (5-1).

$$1 < \beta 4T/\beta 4W < 5 \tag{5}$$

$$1.2 < \beta 4T/\beta 4W < 3 \tag{5-1}$$

In the variable magnification optical system of the above-mentioned aspect, assuming that in a state in which an infinite distance object is in focus, a lateral magnification of the third group at the telephoto end is β3T, a lateral magnification of the third group at the wide angle end is β3W, a lateral magnification of the fourth group at the telephoto end is β4T, and a lateral magnification of the fourth group at the wide angle end is β4W, it is preferable to satisfy Conditional Expression (6).

$$0.25 < (\beta 3T/\beta 3W)/(\beta 4T/\beta 4W) < 2 \tag{6}$$

In the variable magnification optical system of the above-mentioned aspect, assuming that a lateral magnification of the fifth group at the wide angle end in a state in which an infinite distance object is in focus is β5W, it is preferable to satisfy Conditional Expression (7).

$$1<\beta 5W<3 \tag{7}$$

In the variable magnification optical system of the above-mentioned aspect, it is preferable that the reflective surface of the first mirror and the reflective surface of the second mirror have spherical shapes, and the first group includes at least one spherical lens in the optical path between the second mirror and the intermediate image.

In the variable magnification optical system of the above-mentioned aspect, assuming that an average of partial dispersion ratios of all positive lenses in the second group between a g line and an F line is θgF2P, and an average of partial dispersion ratios of all negative lenses in the second group between the g line and the F line is θgF2N, it is preferable to satisfy Conditional Expression (8).

$$-0.15<\theta gF2P-\theta gF2N<-0.005 \tag{8}$$

In the variable magnification optical system of the above-mentioned aspect, assuming that an average of partial dispersion ratios of all positive lenses in the second group between a C line and a t line is θCt2P, and an average of partial dispersion ratios of all negative lenses in the second group between the C line and the t line is θCt2N, it is preferable to satisfy Conditional Expression (9).

$$0.01<\theta Ct2P-\theta Ct2N<0.3 \tag{9}$$

In the variable magnification optical system of the above-mentioned aspect, assuming that an average of partial dispersion ratios of all positive lenses in the fourth group between a g line and an F line is θgF4P, and an average of partial dispersion ratios of all negative lenses in the fourth group between the g line and the F line is θgF4N, it is preferable to satisfy Conditional Expression (10).

$$-0.15<\theta gF4P-\theta gF4N<-0.005 \tag{10}$$

In the variable magnification optical system of the above-mentioned aspect, assuming that an average of partial dispersion ratios of all positive lenses in the fourth group between a C line and a t line is θCt4P, and an average of partial dispersion ratios of all negative lenses in the fourth group between the C line and the t line is θCt4N, it is preferable to satisfy Conditional Expression (11).

$$0.01<\theta Ct4P-\theta Ct4N<0.3 \tag{11}$$

According to another aspect of the technique of the present disclosure, there is provided an imaging apparatus comprising the variable magnification optical system of the above-mentioned aspect.

In the present specification, it should be noted that the terms "consisting of" and "consists of" mean that the lens may include not only the above-mentioned constituent elements but also lenses substantially having no powers, optical elements, which are not lenses, such as a stop, a filter, and a cover glass, and mechanism parts such as a lens flange, a lens barrel, an imaging element, and a camera shaking correction mechanism.

It should be noted that, in the present specification, the term "~group having a positive power" means that the group has a positive power as a whole. Similarly, the term "~group having a negative power" means that the group has a negative power as a whole. The terms "a lens having a positive power", "a lens with a positive power", and "a positive lens" are synonymous. The terms "a lens having a negative power", "a lens with a negative power", and "a negative lens" are synonymous. The "second group", "third group", "fourth group", and "fifth group" each are not limited to a configuration in which the lens group consists of a plurality of lenses, but the lens group may consist of only one lens.

A compound aspherical lens (that is, a lens in which a spherical lens and an aspherical film formed on the spherical lens are integrally formed and function as one aspherical lens as a whole) is not regarded as cemented lenses, but the compound aspherical lens is regarded as one lens. The sign of power and the surface shape of each optical element including an aspherical surface will be considered in the paraxial region. The "power" used for a lens is synonymous with a refractive power. The term "having a power" means that the reciprocal of the focal length is not zero. The "refractive optical system" in the present specification is a system that does not include a refractive optical element having a power.

The "focal length" used in the conditional expressions is a paraxial focal length. The values of the conditional expressions other than the conditional expression about the partial dispersion ratio are values in a case where the d line is used as a reference in a state in which the infinite distance object is in focus. The "d line", "C line", "F line", "g line", and "t line" described in the present specification are emission lines. In the present specification, it is assumed that the wavelength of the d line is 587.56 nm (nanometers), the wavelength of the C line is 656.27 nm (nanometers), the wavelength of the F line is 486.13 nm (nanometers), the wavelength of the g line is 435.83 nm (nanometers), and the wavelength of the t line is 1013.98 nm (nanometers). The partial dispersion ratio θgF between the g line and the F line of a certain lens is defined by θgF=(Ng−NF)/(NF−NC), in which Ng, NF, and NC are the refractive indexes of the lens at the g line, the F line, and the C line. The partial dispersion ratio θCt between the C line and the t line of a certain lens is defined by θCt=(NC−Nt)/(NF−NC), in which Nt, NF, and NC are the refractive indexes of the lens at the t line, the F line, and the C line. The term "near infrared light" in the present specification is light in the wavelength band of 700 nm (nanometers) to 1000 nm (nanometers).

According to the technique of the present disclosure, it is possible to provide a catadioptric variable magnification optical system that has more favorable optical performance and can be reduced in size, and an imaging apparatus comprising the variable magnification optical system.

DESCRIPTION OF EMBODIMENTS

Figure 1:
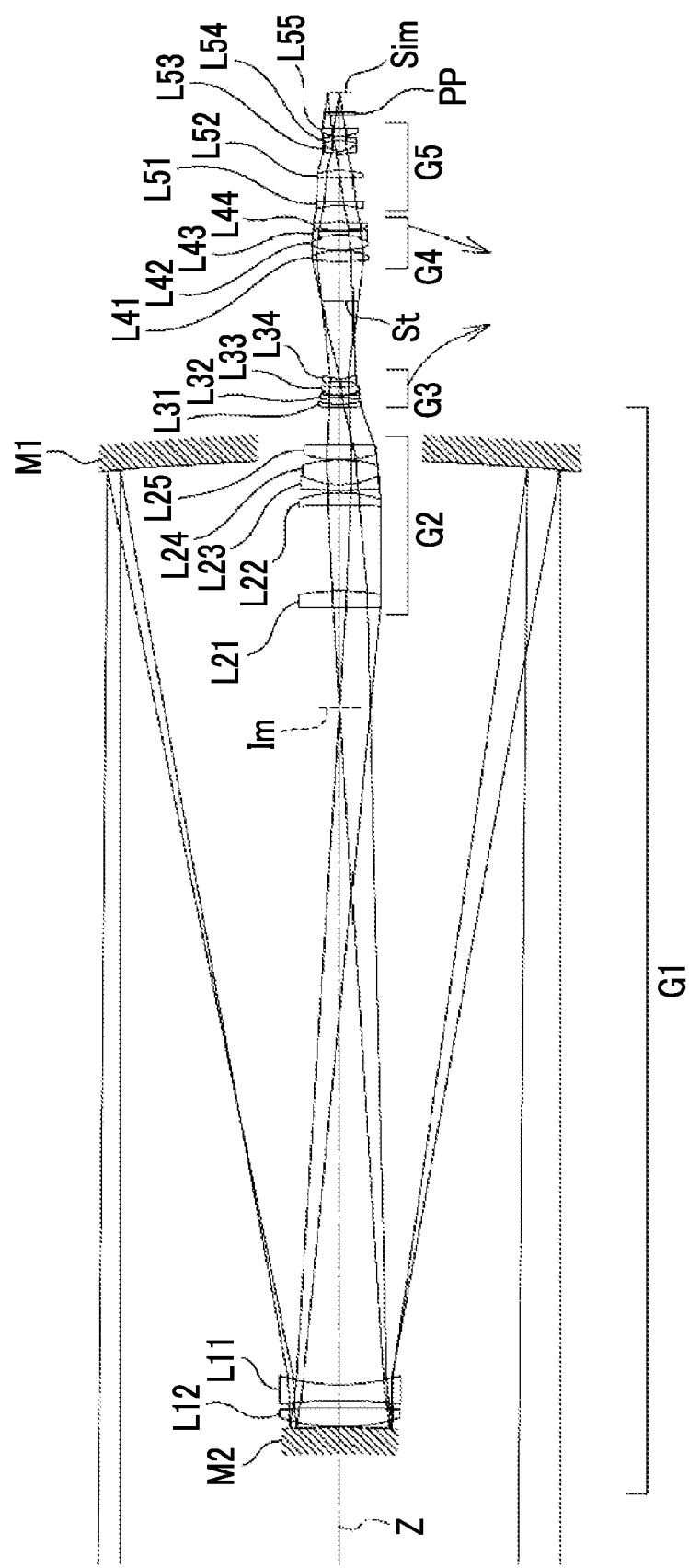
FIG. 1 is a cross-sectional view illustrating a configuration and an optical path at a wide angle end of a variable magnification optical system (variable magnification optical system of Example 1) according to an embodiment.

Hereinafter, an example of the embodiment according to the technique of the present disclosure will be described, with reference to the drawings. FIG. 1 shows a configuration and a cross-sectional view of an optical path at the wide angle end of a variable magnification optical system according to an embodiment of the present disclosure. In FIG. 1, the left side is the object side, and the right side is the image side. The example shown in FIG. 1 corresponds to the variable magnification optical system of Example 1 to be described later. This variable magnification optical system can be applied to, for example, a surveillance camera.

The variable magnification optical system of the present embodiment comprises, as groups having powers, only five groups consisting of, in order from the object side to the image side along the optical path, a first group G1 that has a positive power, a second group G2 that has a positive power, a third group G3 that has a negative power, a fourth group G4 that has a positive power, and a fifth group G5 that has a positive power. An aperture stop St is disposed between the third group G3 and the fourth group G4. It should be noted that the aperture stop St in FIG. 1 does not indicate the shape and size, but indicates the position in the optical axis direction, and the illustration method for the aperture stop St is the same for other drawings.

FIG. 1 shows an example in which an optical member PP having a parallel plate shape is disposed between the variable magnification optical system and an image plane Sim under assumption that the variable magnification optical system is applied to the imaging apparatus. The optical member PP is a member assumed to include various filters, a cover glass, and the like. The various filters include, for example, a low pass filter, an infrared cut filter, a filter that cuts a specific wavelength region, and the like. The optical member PP is a member having no power, and a configuration in which the optical member PP is omitted is also possible.

For example, each group of the example of FIG. 1 is composed of the following optical elements. That is, the first group G1 consists of a first mirror M1, a lens L11, a lens L12, and a second mirror M2 in order from the object side to the image side along the optical path. The second group G2 consists of five lenses L21 to L25 in order from the object side to the image side. The third group G3 consists of four lenses L31 to L34 in order from the object side to the image side. The fourth group G4 consists of four lenses L41 to L44 in order from the object side to the image side. The fifth group G5 consists of five lenses L51 to L55 in order from the object side to the image side. In the example of FIG. 1, all the above-mentioned optical elements have a common optical axis Z.

The variable magnification optical system in the example of FIG. 1 is a zooming optical system. During changing magnification from the wide angle end to the telephoto end, the first mirror M1, the second mirror M2, the second group G2, the aperture stop St, and the fifth group G5 remain stationary with respect to the image plane Sim, the third group G3 moves from the object side to the image side, and the fourth group G4 moves from the image side to the object side. In FIG. 1, arrows under the third group G3 and the fourth group G4 schematically indicate the movement loci of the respective groups during changing magnification from the wide angle end to the telephoto end, respectively.

In the example of FIG. 1, the first mirror M1 has a ring shape having an opening portion in the center. In the example of FIG. 1, the light incident on the variable magnification optical system from the object is first reflected to the object side by the first mirror M1, passes through the lens L11 and the lens L12 in this order, is then reflected to the image side by the second mirror M2 and passes through the lens L12 and the lens L11 in this order, and then passes through the second group G2, the third group G3, the fourth group G4, and the fifth group G5 and reaches the image plane Sim.

In a state in which the infinite distance object is in focus, an intermediate image Im is formed in the optical path between the first group G1 and the second group G2. In FIG. 1, only a part including the vicinity of the optical axis of the intermediate image Im is simply represented by the dotted line, and its shape is not always accurate. The intermediate image Im is reformed on the image plane Sim through the second group G2, the third group G3, the fourth group G4, and the fifth group G5. That is, the second group G2, the third group G3, the fourth group G4, and the fifth group G5 function as a relay optical system. By using the variable magnification optical system as the image-reforming optical system, the lens diameter of the group that moves during changing magnification can be reduced. As a result, there is an advantage in achieving reduction in size of the device and speeding up the magnification variation operation.

The first group G1 has a positive power as a whole. The first group G1 comprises a first mirror M1 and a second mirror M2. The first mirror M1 has a concave reflective surface facing toward the object side, and reflects the light, which is incident from the object, toward the object side. The second mirror M2 has a convex reflective surface facing toward the image side, and reflects light, which is directed from the first mirror M1 toward the object side, toward the image side. That is, the first mirror M1 and the second mirror M2 are disposed such that their reflective surfaces face each other. Since the mirror does not contribute to chromatic aberration, the two mirrors do not cause chromatic aberration which is a problem in the long focus lens system. By using the mirror in the first group G1, it is easy to obtain a super-telephoto optical system without scarcely causing chromatic aberration. Further, by using two mirrors in which the reflective surfaces are disposed to face each other, the optical path can be deflected. Therefore, the total optical length can be shortened.

The first mirror M1 is an optical element positioned closest to the object side on the optical path among optical elements which have a power and are included in the variable magnification optical system. In a case where the refractive optical system is disposed in the optical path on the object side of the first mirror M1, the diameter of the refractive optical system increases and the price therefore becomes expensive. Further, in a case where the refractive optical system is disposed in the optical path on the object side of the first mirror M1, the center of gravity of the variable magnification optical system is biased toward the tip portion and the weight balance is deteriorated, which is not preferable. Further, since the reflection type optical element does not transmit rays, there is an advantage in that the degree of freedom in material selection is higher than that of the transmission type optical element.

It is preferable that the reflective surface of the first mirror M1 and the reflective surface of the second mirror M2 are spherical. In such a case, the elements can be manufactured at a lower cost than elements having an aspherical shape. In a case where the reflective surface of the first mirror M1 and the reflective surface of the second mirror M2 each have a spherical shape, the first group G1 may be configured to include at least one spherical lens in the optical path between the second mirror M2 and the intermediate image Im. By disposing at least one spherical lens at the above position, it is possible to correct spherical aberration generated by the two spherical mirrors. Therefore, high optical performance can be easily obtained without using an aspherical mirror that is difficult to be subjected to processing and measurement.

In the example of FIG. 1, the negative lens L11 and the positive lens L12 are disposed as two spherical lenses in the optical path between the second mirror M2 and the intermediate image Im. These two spherical lenses are also positioned in the optical path between the first mirror M1 and the second mirror M2. Therefore, luminous flux pass through two spherical lenses twice, that is, pass therethrough first in a case where the light reflected by the first mirror M1 is directed toward the second mirror M2 and pass therethrough second in a case where the light reflected by the second mirror M2 is directed toward the intermediate image Im. By disposing the spherical lens in the optical path in which the ray reciprocates in such a manner, it is easy to satisfactorily correct spherical aberration even in a case where the number of optical elements such as lenses and mirrors is reduced, and it is easy to satisfactorily correct spherical aberration even in a case where the number of optical elements is reduced and the aspherical surface is not used for both the first mirror M1 and the second mirror M2.

In a case where the number of lenses disposed in the optical path between the second mirror M2 and the intermediate image Im is one or two, as compared with the case where three or more lenses are used, the load on the object side part of the variable magnification optical system can be minimized, and the strength necessary for providing the gantry on the variable magnification optical system can be reduced. In a case where the number of lenses disposed in the optical path between the second mirror M2 and the intermediate image Im is one, the number of optical elements used is less than that in a case where two or more lenses are used. Therefore, there is an advantage in terms of cost and manufacturability.

The first group G1 is preferably remaining stationary with respect to the image plane Sim during changing magnification. That is, it is preferable that all the optical elements constituting the first group G1 including the elements other than the mirror remain stationary with respect to the image plane Sim during changing magnification. In such a case, the configuration of the apparatus can be simplified.

The second group G2 is a refractive optical system and has a positive power as a whole. By disposing the second group G2 that has a positive power at the position which is closer to the image side than the intermediate image Im and at which the luminous flux is changed to diverge, the divergence of the luminous flux can be suppressed. Thereby, there is an advantage in reduction in size of the lens closer to the image side than the second group G2.

The third group G3 is a refractive optical system and has a negative power as a whole. The fourth group G4 is a refractive optical system and has a positive power as a whole. That is, the second group G2, the third group G3, and the fourth group G4 have positive, negative, and positive powers, respectively, and are disposed such that the powers of adjacent groups have different signs from each other. As a result, the power of each group can be strengthened, and the amount of movement of each group during changing magnification can be shortened. Therefore, the optical system can be miniaturized.

It is preferable that the fourth group G4 includes a biconvex lens disposed closest to the object side and a cemented lens disposed closer to the image side than the biconvex lens and formed by cementing two lenses including a positive lens and a negative lens. In the cemented lens, the positive lens and the negative lens may be cemented in order from the object side, or the negative lens and the positive lens may be cemented in order from the object side. Since the biconvex lens of the fourth group G4 can exert a converging action on the luminous flux emitted from the third group G3 due to the divergent action in the third group G3, it is easy to suppress an increase in outer diameter of the lens of the fourth group G4. Further, by disposing the cemented lens on the image side of the biconvex lens, it is possible to correct longitudinal chromatic aberration generated by the biconvex lens.

The fifth group G5 of the example of FIG. 1 is a refractive optical system. The fifth group G5 has a positive power as a whole. By disposing the fifth group G5 that has a positive power at the position closest to the image plane Sim, it is possible to correct the field curvature and it is easy to obtain favorable optical performance from the center to the periphery of the image forming region.

The aperture stop St is disposed between the third group G3 and the fourth group G4. Thereby, the aperture stop St can be miniaturized. In order to cope with various imaging conditions, it is preferable that the opening diameter of the aperture stop St is variable, and in particular, it is preferable that the opening diameter is variable in surveillance camera application in which imaging is performed from daytime to nighttime. On the other hand, as the aperture stop St increases, the stop mechanism that changes the opening diameter also increases. Therefore, it is preferable that the aperture stop St also has a small size in order to reduce the size of the apparatus.

It is preferable that the position where the aperture stop St is disposed is a position where the peripheral light amount ratio is unlikely to decrease in a case where the aperture stop St is narrowed down. In a configuration such as this variable magnification optical system, it is conceivable that the aperture stop St is disposed in the vicinity of either the first mirror M1 or the second mirror M2. However, in a case where the aperture stop St is placed in the vicinity of the first mirror M1, the size of the stop mechanism increases. Further, in a case where the aperture stop St is placed in the vicinity of the second mirror M2, a part of the incident luminous flux is blocked by the stop mechanism. Therefore, the light amount loss increases, and the value of the optical system for application of the surveillance camera which can be used even in low illuminance is reduced.

In a case where the aperture stop St is disposed in the optical path closer to the image side than the intermediate image Im, it is preferable that the aperture stop St is disposed at a position where a part of the image forming region is not blocked from light in a case where the aperture stop St is narrowed down. Therefore, it is preferable that the position of the aperture stop St in the optical axis direction is within a range from the point (hereinafter referred to as point P1), at which the upper ray of the on-axis luminous flux and the upper ray of the off-axis luminous flux intersect with each other, to the point (hereinafter referred to as point P2) at which the lower ray of the on-axis luminous flux and the lower ray of the off-axis luminous flux intersect with each other.

Figure 2:
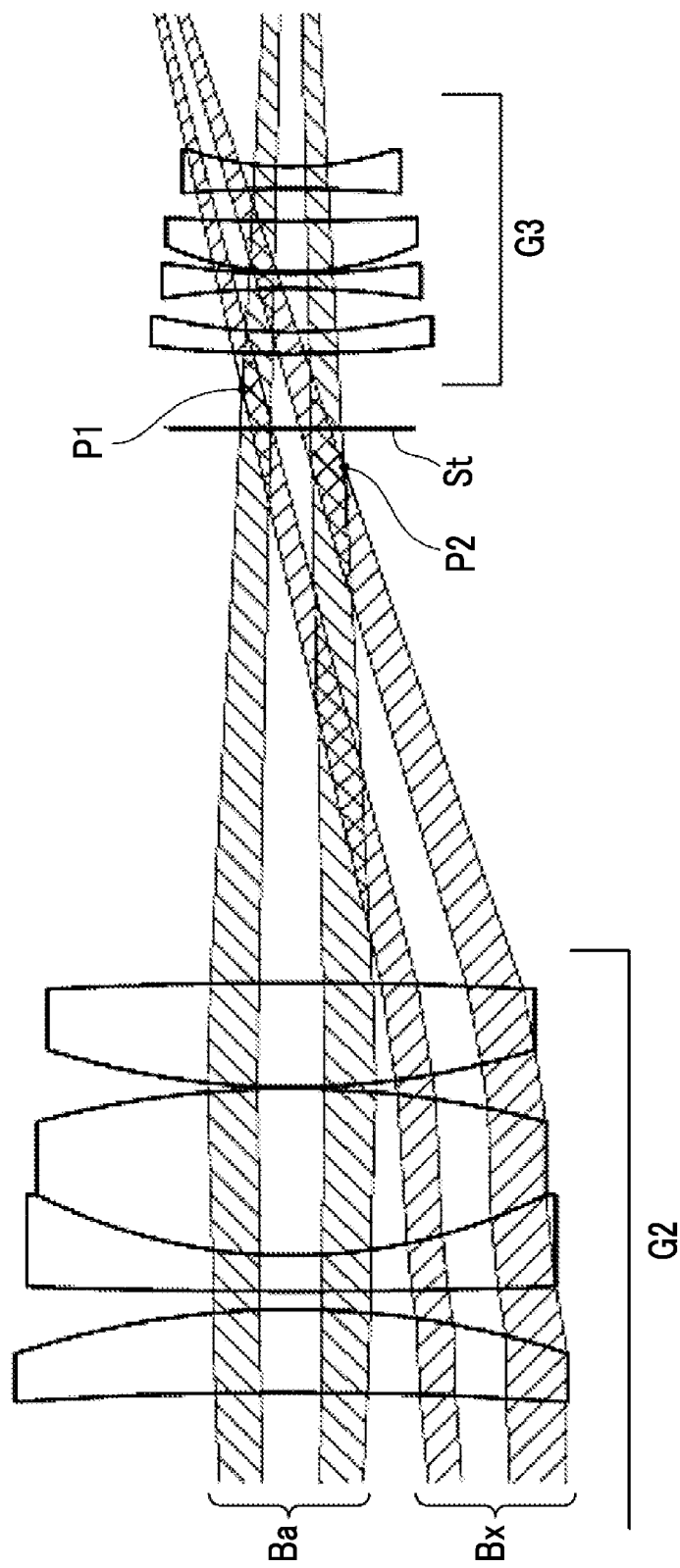
FIG. 2 is a partial cross-sectional view illustrating a configuration and an optical path in a comparative example in which an aperture stop is disposed between a second group and a third group.

As a comparative example, FIG. 2 shows an example in which the aperture stop St is disposed between the second group G2 and the third group G3. In this variable magnification optical system, the luminous flux near the optical axis is not used for image formation. Therefore, in FIG. 2, in the on-axis luminous flux Ba and the off-axis luminous flux Bx, a part not used for image formation is outlined and a part used for image formation is hatched. In a case where the aperture stop St is disposed between the second group G2 and the third group G3, the range from the point P1 to the point P2 is in the vicinity of the third group as shown in FIG. 2. Therefore, as compared with the case where the aperture stop St is disposed between the third group G3 and the fourth group G4, the spacing between the second group G2 and the aperture stop St increases at the wide angle end, and therefore, the spacing between the second group G2 and the third group G3 also increases. As a result, the total optical length increases.

Figure 3:
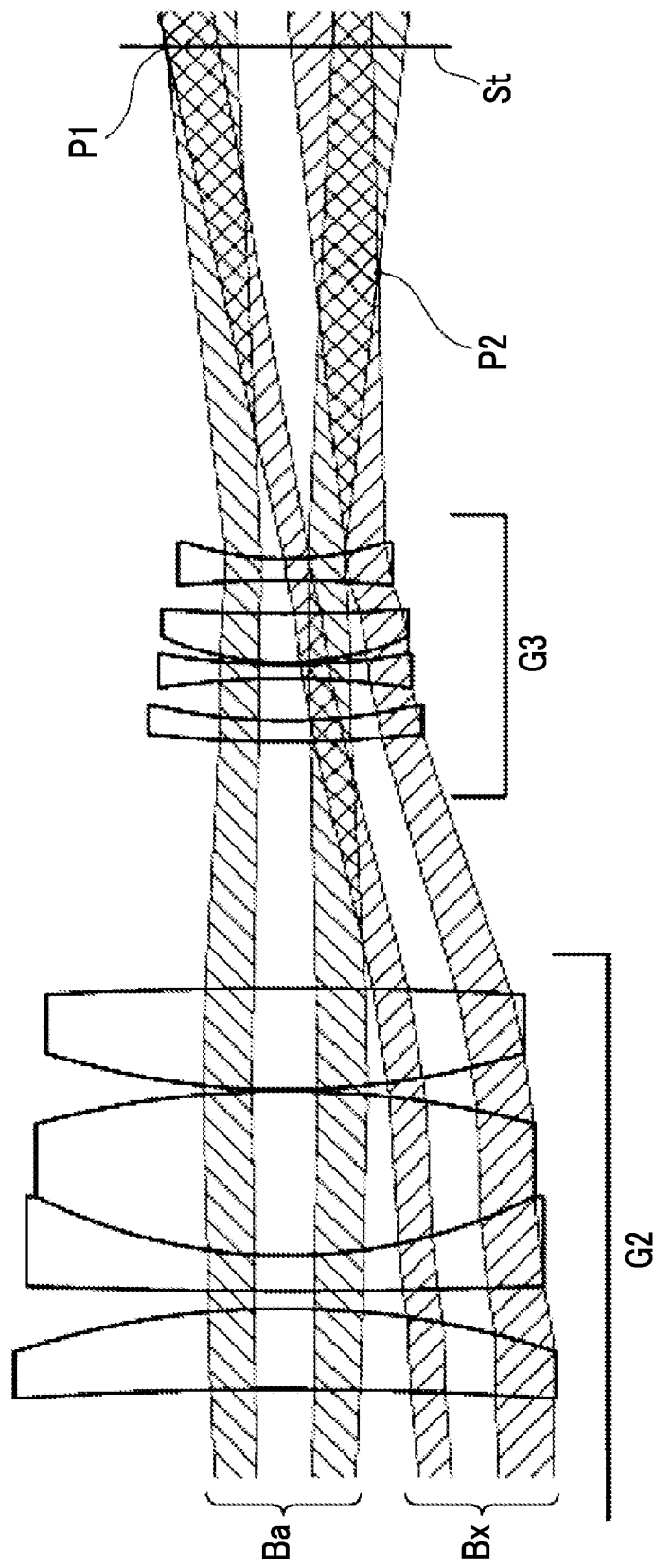
FIG. 3 is a partial cross-sectional view illustrating a configuration and an optical path in an example in which an aperture stop is disposed between a third group and a fourth group.

FIG. 3 shows an example in which the aperture stop St is disposed between the third group G3 and the fourth group G4. In such a case, the off-axis luminous flux Bx emitted from the second group G2 and incident on the third group G3 is diverged by the third group G3 that has a negative power. Therefore, the tilt angle of the light of the off-axis luminous flux emitted from the third group G3 with respect to the optical axis Z is less than the tilt angle of the off-axis luminous flux emitted from the second group G2 with respect to the optical axis Z. Therefore, the points P1 and P2 are positioned closer to the image side than in the case where the aperture stop St is disposed between the second group G2 and the third group G3. As shown in FIG. 3, in a case where the aperture stop St is disposed between the third group G3 and the fourth group G4, unlike the example of FIG. 2, there is no aperture stop St on the object side of the third group G3. Therefore, the spacing between the second group G2 and the third group G3 at the wide angle end can be shortened, and at the same time, the amount of movement of the third group G3 necessary for magnification variation can be ensured.

In a case where the aperture stop St is disposed between the fourth group G4 and the fifth group G5, as compared with the case where the aperture stop St is disposed at a position other than that, it is preferable that the aperture stop St pass more rays under the off-axis luminous flux. Therefore, the outer diameter of the lens of the third group G3 increases.

The aperture stop St remains stationary with respect to the image plane Sim during changing magnification. In a case where the aperture stop St is configured to move during changing magnification, power will be supplied to the drive component driving the aperture stop St, and there is a risk that the lead wire for that purpose is disconnected. On the other hand, in a configuration in which the aperture stop St remains stationary during changing magnification, such a risk does not occur. Therefore, the durability, which is important for monitoring applications, can be maintained higher.

Next, the configuration for the conditional expressions of the variable magnification optical system of the present embodiment will be described. In the variable magnification optical system, the first group G1 remains stationary with respect to the image plane Sim during changing magnification. Assuming that a focal length of the variable magnification optical system at the telephoto end is fT and a focal length of the first group G1 is f1, it is preferable to satisfy Conditional Expression (1). By not allowing the result of Conditional Expression (1) to be equal to or less than the lower limit, the power of the first group G1 is prevented from becoming excessively weakened, and it is possible to suppress an increase in total optical length. By not allowing the result of Conditional Expression (1) to be equal to or greater than the upper limit, the spacing between the second mirror M2 and the intermediate image Im is prevented from becoming excessively shortened. Therefore, the intermediate image Im is positioned closer to the image side. As a result, the second group G2 is also positioned closer to the image side, and the distance between the second group G2 and the second mirror M2 can be increased. As a result, the amount of the luminous flux near the optical axis blocked by the second group G2 can be further reduced. Thus, there is an advantage in ensuring the amount of light. In a case where the distance between the second group G2 and the second mirror M2 decreases, the amount of luminous flux near the optical axis blocked by the second group G2 increases. Further, in a case of the configuration satisfying Conditional Expression (1-1), more favorable characteristics can be obtained.

$$0.5 < |fT/f1| < 4 \quad (1)$$

$$1 < |fT/f1| < 2.5 \quad (1\text{-}1)$$

In a case where the first group G1 remains stationary with respect to the image plane Sim during changing magnification, assuming that a lateral magnification of the second group G2 in a state in which the infinite distance object is in focus is β2, it is preferable to satisfy Conditional Expression (2). By satisfying Conditional Expression (2), there is an advantage in suppressing occurrence of spherical aberration. More specifically, by not allowing the result of Conditional Expression (2) to be equal to or less than the lower limit, the luminous flux emitted from the second group G2 can be appropriately focused. Therefore, the divergence angle of the luminous flux emitted from the third group G3 can be prevented from becoming excessively large. As a result, there is an advantage in suppressing occurrence of spherical aberration. Further, by not allowing the result of Conditional Expression (2) to be equal to or greater than the upper limit, the emission angle of the emitted luminous flux from the second group G2 is prevented from becoming excessively large. As a result, there is an advantage in suppressing occurrence of spherical aberration. Further, in a case of the configuration satisfying Conditional Expression (2-1), more favorable characteristics can be obtained.

$$-2<\beta 2<-0.5 \tag{2}$$

$$-1.5<\beta 2<-1 \tag{2-1}$$

Assuming that a focal length of the third group G3 is f3 and a focal length of the fourth group G4 is f4, it is preferable to satisfy Conditional Expression (3). By not allowing the result of Conditional Expression (3) to be equal to or less than the lower limit, the negative power of the third group G3 is prevented from becoming excessively weak. Therefore, the amount of movement of the third group G3 during changing magnification can be shortened. As a result, it is possible to suppress the increase in total optical length. Further, by shortening the amount of movement of the third group G3, there is an advantage in suppressing the increase in distance between the third group G3 and the aperture stop St at the wide angle end. Therefore, there is an advantage in suppressing the increase in diameter of the outer diameter of the lenses of the third group G3. By not allowing the result of Conditional Expression (3) to be equal to or greater than the upper limit, the positive power of the fourth group G4 is prevented from becoming excessively weak. Thus, there is an advantage in shortening the amount of movement of the fourth group G4 during changing magnification. As a result, it is possible to suppress the increase in total optical length. Further, by shortening the amount of movement of the fourth group G4, there is an advantage in suppressing the increase in distance between the fourth group G4 and the aperture stop St at the wide angle end. Therefore, there is an advantage in suppressing the increase in diameter of the outer diameter of the lenses of the fourth group G4. Further, in a case of the configuration satisfying Conditional Expression (3-1), more favorable characteristics can be obtained.

$$-2<f3/f4<-0.1 \tag{3}$$

$$-1<f3/f4<-0.5 \tag{3-1}$$

Assuming that a lateral magnification of the third group G3 at the telephoto end is $\beta 3T$ and a lateral magnification of the third group G3 at the wide angle end is $\beta 3W$ in a state in which the infinite distance object is in focus, it is preferable to satisfy Conditional Expression (4). By not allowing the result of Conditional Expression (4) to be equal to or less than the lower limit, the amount of movement of the third group G3 during changing magnification can be shortened. Therefore, it is possible to suppress the increase in total optical length. By not allowing the result of Conditional Expression (4) to be equal to or greater than the upper limit, the power of the third group G3 is prevented from becoming excessively strong. Therefore, it is possible to suppress fluctuation in aberration due to the magnification variation. Further, in a case of the configuration satisfying Conditional Expression (4-1), more favorable characteristics can be obtained.

$$1<\beta 3T/\beta 3W<5 \tag{4}$$

$$1.2<\beta 3T/\beta 3W<3.5 \tag{4-1}$$

Assuming that a lateral magnification of the fourth group G4 at the telephoto end is $\beta 4T$ and a lateral magnification of the fourth group G4 at the wide angle end is $\beta 4W$ in a state in which the infinite distance object is in focus, it is preferable to satisfy Conditional Expression (5). By not allowing the result of Conditional Expression (5) to be equal to or less than the lower limit, the amount of movement of the fourth group G4 during changing magnification can be shortened. Therefore, it is possible to suppress the increase in total optical length. By not allowing the result of Conditional Expression (5) to be equal to or greater than the upper limit, the power of the fourth group G4 is prevented from becoming excessively strong. Therefore, it is possible to suppress fluctuation in aberration due to the magnification variation. Further, in a case of the configuration satisfying Conditional Expression (5-1), more favorable characteristics can be obtained.

$$1<\beta 4T/\beta 4W<5 \tag{5}$$

$$1.2<\beta 4T/\beta 4W<3 \tag{5-1}$$

Assuming that in a state in which the infinite distance object is in focus, a lateral magnification of the third group G3 at the telephoto end is $\beta 3T$, a lateral magnification of the third group G3 at the wide angle end is $\beta 3W$, a lateral magnification of the fourth group G4 at the telephoto end is $\beta 4T$, and a lateral magnification of the fourth group G4 at the wide angle end is $\beta 4W$, it is preferable to satisfy Conditional Expression (6). By satisfying Conditional Expression (6), the third group G3 and the fourth group G4 can be contributed to magnification variation in a well-balanced manner. By satisfying Conditional Expression (6), the power of only one of the third group G3 and the fourth group G4 is prevented from becoming excessively strong. Therefore, it is possible to reduce fluctuation in aberration due to the magnification variation as much as possible. Further, in a case of the configuration satisfying Conditional Expression (6-1), more favorable characteristics can be obtained.

$$0.25<(\beta 3T/\beta 3W)/(\beta 4T/\beta 4W)<2 \tag{6}$$

$$0.5<(\beta 3T/\beta 3W)/(\beta 4T/\beta 4W)<1.5 \tag{6-1}$$

Assuming that a lateral magnification of the fifth group G5 at the wide angle end in a state in which the infinite distance object is in focus is $\beta 5W$, it is preferable to satisfy Conditional Expression (7). By not allowing the result of Conditional Expression (7) to be equal to or less than the lower limit, the combined focal length from the first group G1 to the fourth group G4 can be shortened. Therefore, the total optical length can be shortened. By not allowing the result of Conditional Expression (7) to be equal to or greater than the upper limit, it is possible to suppress an increase in field curvature and suppress deterioration of the image in the peripheral portion of the image forming region. Further, in a case of the configuration satisfying Conditional Expression (7-1), more favorable characteristics can be obtained.

$$1<\beta 5W<3 \tag{7}$$

$$1.2<\beta 5W<2.5 \tag{7-1}$$

Assuming that an average of the partial dispersion ratios of all the positive lenses in the second group G2 between the g line and the F line is $\theta gF2P$ and an average of the partial dispersion ratios of all the negative lenses in the second group G2 between the g line and the F line is $\theta gF2N$, it is preferable to satisfy Conditional Expression (8). By satisfying Conditional Expression (8), it is possible to suppress occurrence of secondary longitudinal chromatic aberration in the visible light region. Further, in a case of the configuration satisfying Conditional Expression (8-1), more favorable characteristics can be obtained.

$$-0.15 < \theta gF2P - \theta gF2N < -0.005 \quad (8)$$

$$-0.09 < \theta gF2P - \theta gF2N < -0.015 \quad (8\text{-}1)$$

Assuming that an average of the partial dispersion ratios of all the positive lenses in the second group G2 between the C line and the t line is θCt2P and an average of the partial dispersion ratios of all the negative lenses in the second group G2 between the C line and the t line is θCt2N, it is preferable to satisfy Conditional Expression (9). By satisfying Conditional Expression (9), it is possible to suppress occurrence of secondary longitudinal chromatic aberration in a region from the red light to near infrared light. Further, in a case of the configuration satisfying Conditional Expression (9-1), more favorable characteristics can be obtained.

$$0.01 < \theta Ct2P - \theta Ct2N < 0.3 \quad (9)$$

$$0.025 < \theta Ct2P - \theta Ct2N < 0.2 \quad (9\text{-}1)$$

Assuming that an average of the partial dispersion ratios of all the positive lenses in the fourth group G4 between the g line and the F line is θgF4P and an average of the partial dispersion ratios of all the negative lenses in the fourth group G4 between the g line and the F line is θgF4N, it is preferable to satisfy Conditional Expression (10). By satisfying Conditional Expression (10), it is possible to suppress occurrence of secondary longitudinal chromatic aberration and secondary lateral chromatic aberration in the visible light region. Further, in a case of the configuration satisfying Conditional Expression (10-1), more favorable characteristics can be obtained.

$$-0.15 < \theta gF4P - \theta gF4N < -0.005 \quad (10)$$

$$-0.09 < \theta gF4P - \theta gF4N < -0.015 \quad (10\text{-}1)$$

Assuming that an average of the partial dispersion ratios of all the positive lenses of the fourth group between the C line and the t line G4 is θCt4P and an average of the partial dispersion ratios of all the negative lenses of the fourth group G4 between the C line and the t line is θCt4N, it is preferable to satisfy Conditional Expression (11). By satisfying Conditional Expression (11), it is possible to suppress occurrence of secondary longitudinal chromatic aberration and secondary lateral chromatic aberration in the region from the red light to near infrared light. Further, in a case of the configuration satisfying Conditional Expression (11-1), more favorable characteristics can be obtained.

$$0.01 < \theta Ct4P - \theta Ct4N < 0.3 \quad (11)$$

$$0.025 < \theta Ct4P - \theta Ct4N < 0.2 \quad (11\text{-}1)$$

The above-mentioned preferred configurations and available configurations may be optional combinations, and it is preferable to selectively adopt the configurations in accordance with necessary specification. In addition, various modifications can be made without departing from the scope of the technique of the present disclosure. For example, the number of lenses constituting each group can also be different from the number shown in FIG. 1. Further, the variable magnification optical system can be a varifocal optical system.

Then, numerical examples of the variable magnification optical system of the present disclosure will be described. The reference numerals attached to the lenses in the cross-sectional views of each example are used independently for each example in order to avoid complication of description due to an increase in number of digits of the reference numerals. Therefore, even in a case where common reference numerals are attached in the drawings of different examples, constituent element do not necessarily have a common configuration.

Example 1

FIG. 1 shows a cross-sectional view and an optical path of the variable magnification optical system of Example 1. The configuration and the illustration method thereof are as described above, and thus, the repeated description will not be given. The variable magnification optical system of Example 1 is a zooming optical system consisting of, in order from the object side to the image side along the optical path, a first group G1 that has a positive power, a second group G2 that has a positive power, a third group G3 that has a negative power, an aperture stop St, a fourth group G4 that has a positive power, and a fifth group G5 that has a positive power. An intermediate image Im is formed in the optical path between the first group G1 and the second group G2. During changing magnification from the wide angle end to the telephoto end, the third group G3 moves to the image side, the fourth group G4 moves to the object side, and other constituent element including the aperture stop St remain stationary with respect to the image plane Sim. The first group G1 consists of a ring-shaped first mirror M1, a second mirror M2, a lens L11, and a lens L12. The second group G2 consists of lenses L21 to L25. The third group G3 consists of lenses L31 to L34. The fourth group G4 consists of lenses L41 to L44. The fifth group G5 consists of lenses L51 to L55. The above description is the outline of the variable magnification optical system of Example 1.

Regarding the variable magnification optical system of Example 1, Table 1A and Table 1B show basic lens data, and Table 2 shows specifications and variable surface spacings. Here, the basic lens data is divided into two tables, Table 1A and Table 1B, in order to avoid lengthening of one table. Table 1A shows the first group G1, the second group G2, and the third group G3, and Table 1B shows the aperture stop St, the fourth group G4, the fifth group G5, and the optical member PP. In Table 1A and Table 1B, the rightmost column is divided into groups, and the reference signs G1 to G5 of the respective groups are shown.

Table 1A and Table 1B show constituent element along the optical path. In Table 1A and Table 1B, the column of Sn shows surface numbers. The surface closest to the object side on the optical path is the first surface, and the surface numbers increase one by one toward the image side along the optical path. The column of R shows curvature radii of the respective surfaces. The column of D shows surface spacings on the optical axis between the respective surfaces and the surfaces adjacent to the image side on the optical path. The column of Nd shows refractive indexes of the constituent element on the d line. The column of vd shows Abbe numbers of the constituent element based on the d line. The column of θgF shows partial dispersion ratios of the constituent element between the g line and the F line. The column of θCt shows partial dispersion ratios of the constituent element between the C line and the t line.

In Table 1A and Table 1B, the sign of the curvature radius of the surface having a convex surface facing toward the object side is positive and the sign of the curvature radius of the surface having a convex surface facing toward the image side is negative. In Table 1A, the term "(reflective surface)" is noted in the Nd column of the surface corresponding to the reflective surface, and in Table 1B, the term "(aperture stop)" is noted in the Nd column of the surface corresponding to the aperture stop St. Further, in Table 1A and Table 1B, regarding the variable surface spacing during changing magnification, surface numbers of the spacings on the object side are attached to "D", and are noted in the column of D.

In Table 2, the absolute value of the focal length, the F number, the maximum image height, and the maximum half angle of view of the variable magnification optical system are respectively written as in the rows indicated by "|focal length|", "FNo.", "Image height", and "half angle of view". Table 2 also shows values of the variable surface spacings. In Table 2, the values in the wide angle end state, the middle focal length state, and the telephoto end state are shown in columns labeled "WIDE", "MIDDLE", and "TELE", respectively. Tables 1A, 1B, and 2 show data in a case where the d line is used as a reference in a state in which the infinite distance object is in focus.

In the data of each table, degrees are used as a unit of an angle, and millimeters (mm) are used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1

| Sn | R | D | Nd | vd | θgF | θCt | |
|---|---|---|---|---|---|---|---|
| 1 | −898.23175 | −345.918 | (Reflective surface) | | | | G1 |
| 2 | 75.73328 | −6.118 | 1.516800 | 64.20 | 0.5343 | 0.8682 | |
| 3 | −194.30232 | −2.458 | | | | | |
| 4 | −327.42883 | −7.361 | 1.516800 | 64.20 | 0.5343 | 0.8682 | |
| 5 | 71.68850 | −0.100 | | | | | |
| 6 | −343.55032 | 0.100 | (Reflective surface) | | | | |
| 7 | 71.68850 | 7.361 | 1.516800 | 64.20 | 0.5343 | 0.8682 | |
| 8 | −327.42883 | 2.458 | | | | | |
| 9 | −194.30232 | 6.118 | 1.516800 | 64.20 | 0.5343 | 0.8682 | |
| 10 | 75.73328 | 290.533 | | | | | |
| 11 | 559.87593 | 6.565 | 1.487490 | 70.24 | 0.5301 | 0.8924 | G2 |
| 12 | −82.97115 | 31.951 | | | | | |
| 13 | −214.23443 | 4.587 | 1.605620 | 43.71 | 0.5721 | 0.7491 | |
| 14 | −47.78757 | 1.000 | | | | | |
| 15 | 357.47466 | 2.000 | 1.900430 | 37.37 | 0.5772 | 0.7219 | |
| 16 | 30.53528 | 9.238 | 1.496999 | 81.54 | 0.5375 | 0.8259 | |
| 17 | −53.84149 | 0.100 | | | | | |
| 18 | 43.67780 | 5.772 | 1.496999 | 81.54 | 0.5375 | 0.8259 | |
| 19 | −249.76265 | D19 | | | | | |
| 20 | 71.02770 | 1.200 | 1.729157 | 54.68 | 0.5445 | 0.8244 | G3 |
| 21 | 31.60856 | 2.422 | | | | | |
| 22 | −44.71843 | 0.800 | 1.603001 | 65.44 | 0.5402 | 0.8281 | |
| 23 | 41.07074 | 0.100 | | | | | |
| 24 | 16.68726 | 2.803 | 1.922860 | 20.88 | 0.6390 | 0.6453 | |
| 25 | 105.80687 | 1.845 | | | | | |
| 26 | −66.80977 | 1.200 | 1.800000 | 29.84 | 0.6018 | 0.6874 | |
| 27 | 17.26331 | D27 | | | | | |

TABLE 1B

Example 1

| Sn | R | D | Nd | vd | θgF | θCt | |
|---|---|---|---|---|---|---|---|
| 28 | ∞ | D28 | (Aperture stop) | | | | |
| 29 | 80.98081 | 4.181 | 1.496999 | 81.54 | 0.5375 | 0.8259 | G4 |
| 30 | −28.01556 | 0.100 | | | | | |
| 31 | 31.63484 | 5.455 | 1.496999 | 81.54 | 0.5375 | 0.8259 | |
| 32 | −24.31990 | 1.500 | 1.762001 | 40.10 | 0.5765 | 0.7347 | |
| 33 | 129.50030 | 0.100 | | | | | |
| 34 | 37.30639 | 3.287 | 1.496999 | 81.54 | 0.5375 | 0.8259 | |
| 35 | −106.17954 | D35 | | | | | |
| 36 | −31.25660 | 1.379 | 1.575006 | 41.50 | 0.5767 | 0.7531 | G5 |
| 37 | 573.72075 | 9.097 | | | | | |
| 38 | −750.85731 | 2.595 | 1.910820 | 35.25 | 0.5822 | 0.7131 | |
| 39 | −31.84110 | 6.361 | | | | | |
| 40 | 25.18259 | 1.001 | 1.804000 | 46.53 | 0.5578 | 0.7716 | |

TABLE 1B-continued

Example 1

| Sn | R | D | Nd | vd | θgF | θCt |
|---|---|---|---|---|---|---|
| 41 | 8.52356 | 4.112 | | | | |
| 42 | −15.57183 | 1.271 | 1.496999 | 81.54 | 0.5375 | 0.8259 |
| 43 | −25.91152 | 0.100 | | | | |
| 44 | 15.12811 | 3.022 | 1.816000 | 46.62 | 0.5568 | 0.7690 |
| 45 | 272.35629 | 5.000 | | | | |
| 46 | ∞ | 1.000 | 1.516800 | 64.20 | 0.5343 | 0.8682 |
| 47 | ∞ | | | | | |

TABLE 2

Example 1

| | WIDE | MIDDLE | TELE |
|---|---|---|---|
| |Focal length| | 492.169 | 1230.422 | 1968.676 |
| FNo. | 3.000 | 6.834 | 10.938 |

TABLE 2-continued

Example 1

| | WIDE | MIDDLE | TELE |
|---|---|---|---|
| Image Height | 4.450 | 4.450 | 4.450 |
| Half angle of view | 0.495 | 0.203 | 0.127 |
| D19 | 13.970 | 30.197 | 37.156 |
| D27 | 29.034 | 12.807 | 5.848 |
| D28 | 14.946 | 8.165 | 4.989 |
| D35 | 6.220 | 13.001 | 16.177 |

Figure 4:
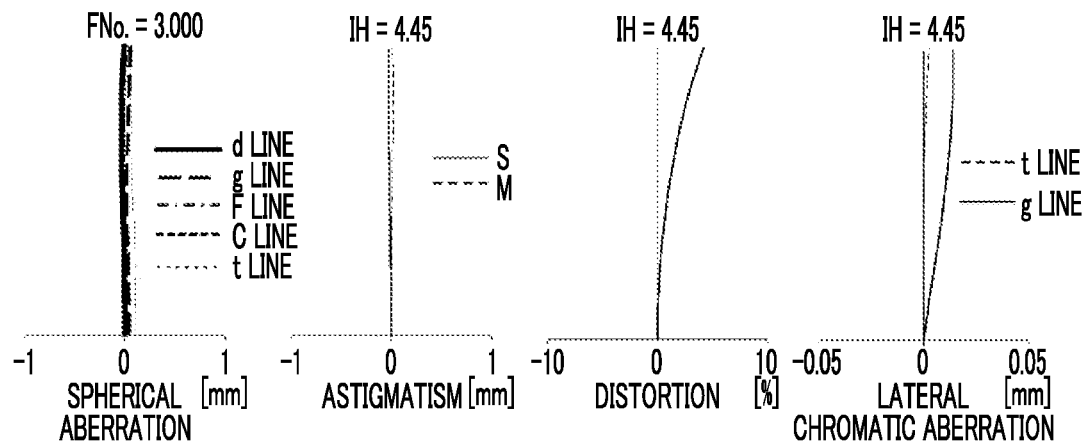
FIG. 4 is a diagram of aberrations of the variable magnification optical system of Example 1.
Figure 4:
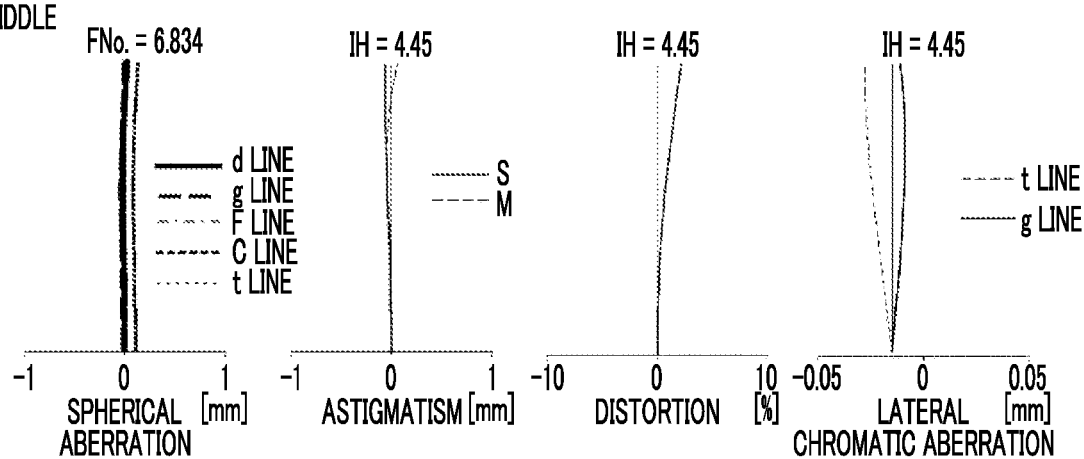
Figure 4:
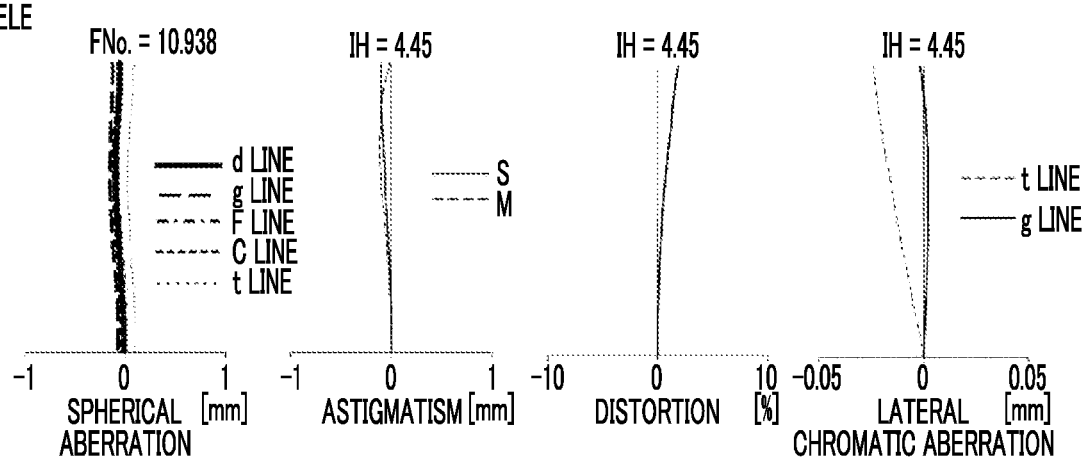

FIG. 4 shows a diagram of aberrations of the variable magnification optical system of Example 1 in a state in which the infinite distance object is in focus. FIG. 4 shows, in order from the left, spherical aberration, astigmatism, distortion, and lateral chromatic aberration. In FIG. 4, the upper part labeled "WIDE" shows aberration diagrams in the wide angle end state, the middle part labeled "MIDDLE" shows aberration diagrams in the middle focal length state, and the lower part labeled "TELE" shows aberration diagrams in the telephoto end state. In the spherical aberration diagram, aberrations at the d line, g line, F line, C line, and t line are indicated by the solid line, the long broken line, the chain line, the short broken line, and the dotted line, respectively. In the astigmatism diagram, aberration in the sagittal direction at the d line is indicated by the solid line, and aberration in the meridional direction at the d line is indicated by the broken line. In the distortion diagram, aberration at the d line is indicated by the solid line. In the lateral chromatic aberration diagram, aberrations at the t line and the g line are respectively indicated by the broken line and the solid line. In the spherical aberration diagram, a value of the F number is shown next to "FNo.=". In the other aberration diagrams, a value of the maximum image height is shown next to "IH=". Since the first mirror M1 has a ring shape, the data of the spherical aberration diagram near 0 on the vertical axis of FIG. 4 is shown as reference data.

Symbols, meanings, description methods, and illustration methods of the respective data pieces according to Example 1 are the same as those in the following examples unless otherwise specified. Therefore, in the following description, repeated description will be omitted.

Example 2

Figure 5:
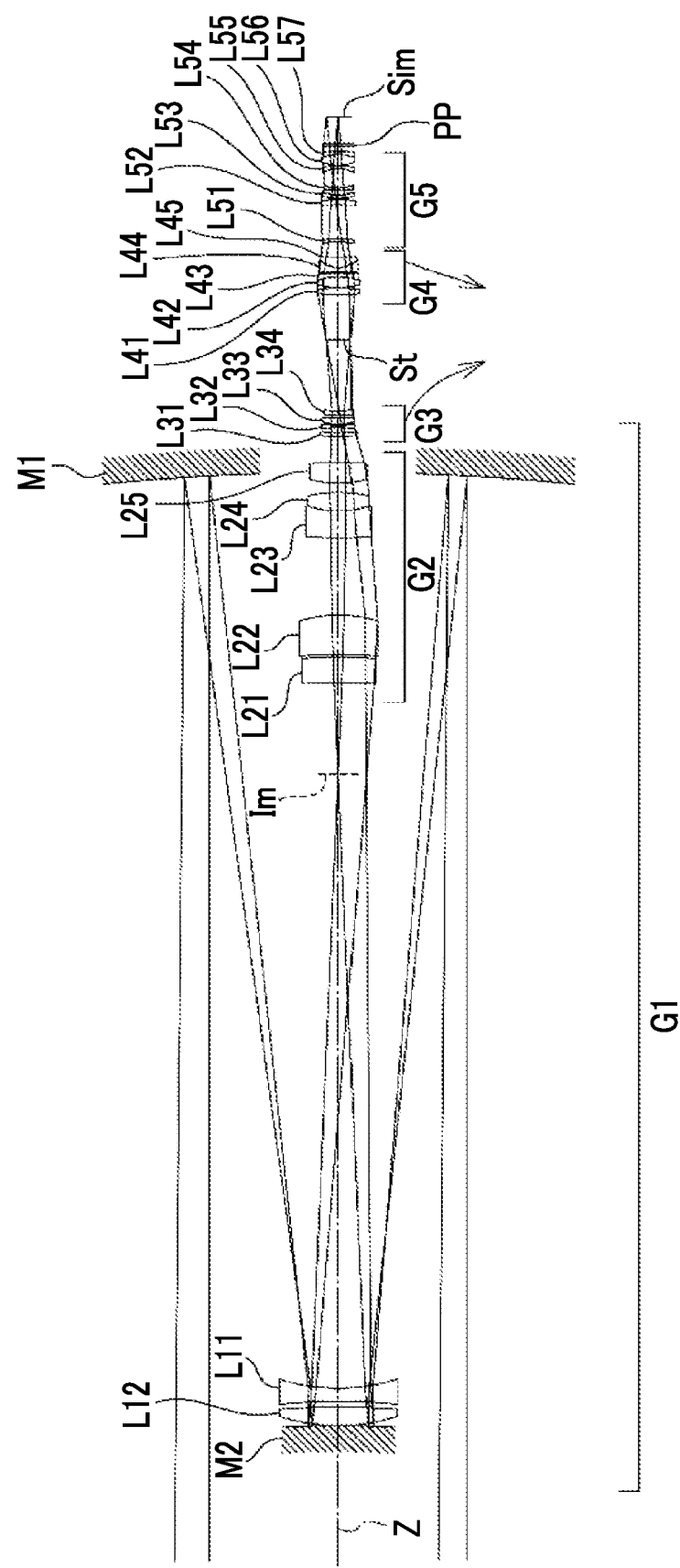
FIG. 5 is a cross-sectional view illustrating a configuration and an optical path at the wide angle end of the variable magnification optical system of Example 2.
Figure 6:
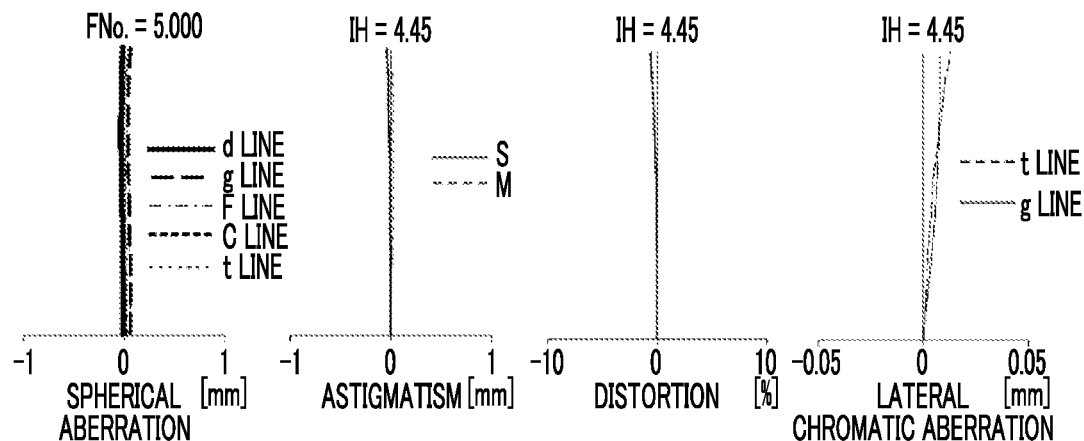
FIG. 6 is a diagram of aberrations of the variable magnification optical system of Example 2.
Figure 6:
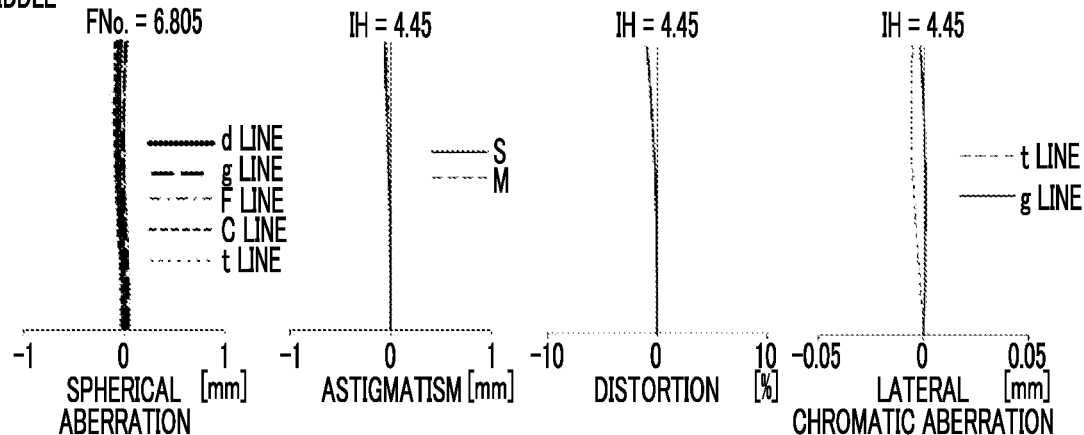
Figure 6:
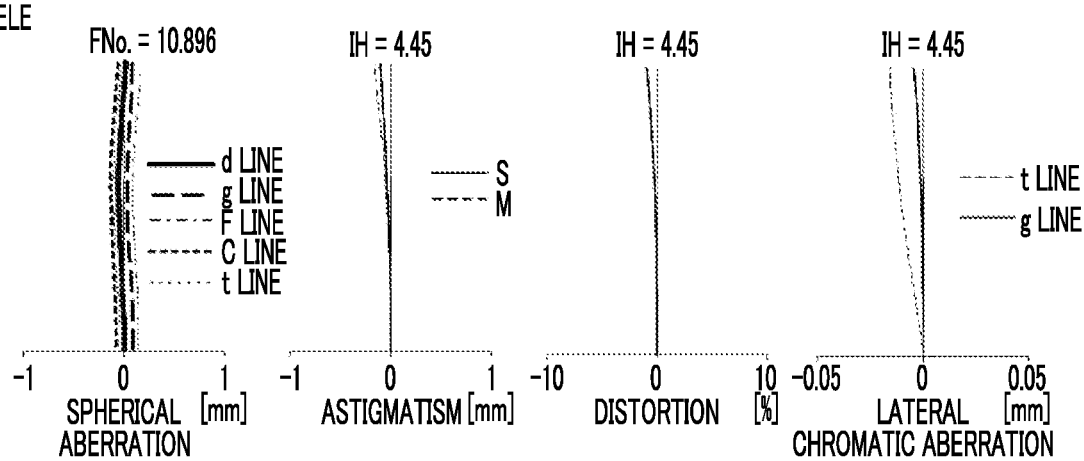

FIG. 5 shows a cross-sectional view and the optical path of the variable magnification optical system of Example 2. The variable magnification optical system of Example 2 has the same configuration as the outline of the variable magnification optical system of Example 1 except that the fourth group G4 consists of lenses L41 to L45 and the fifth group G5 consists of lenses L51 to L57. Regarding the variable magnification optical system of Example 2, Tables 3A and 3B show basic lens data, Table 4 shows specifications and variable surface spacings, and FIG. 6 shows a diagram of aberrations.

TABLE 3A

Example 2

| Sn | R | D | Nd | νd | θgF | θCt | |
|---|---|---|---|---|---|---|---|
| 1 | −909.17394 | −348.494 | (Reflective surface) | | | | G1 |
| 2 | 74.50487 | −5.000 | 1.516800 | 64.20 | 0.5343 | 0.8682 | |
| 3 | −204.98541 | −2.252 | | | | | |
| 4 | −329.95863 | −7.072 | 1.516800 | 64.20 | 0.5343 | 0.8682 | |
| 5 | 71.18716 | −0.100 | | | | | |
| 6 | −378.70578 | 0.100 | (Reflective surface) | | | | |
| 7 | 71.18716 | 7.072 | 1.516800 | 64.20 | 0.5343 | 0.8682 | |
| 8 | −329.95863 | 2.252 | | | | | |
| 9 | −204.98541 | 5.000 | 1.516800 | 64.20 | 0.5343 | 0.8682 | |
| 10 | 74.50487 | 268.254 | | | | | |
| 11 | −1563.97067 | 10.000 | 1.516800 | 64.20 | 0.5343 | 0.8682 | G2 |
| 12 | −150.44402 | 1.032 | | | | | |
| 13 | −144.69608 | 15.000 | 1.516800 | 64.20 | 0.5343 | 0.8682 | |
| 14 | −49.80223 | 29.464 | | | | | |
| 15 | 155.89561 | 10.000 | 1.910820 | 35.25 | 0.5822 | 0.7131 | |
| 16 | 34.15431 | 7.110 | 1.496999 | 81.54 | 0.5375 | 0.8259 | |
| 17 | −49.38454 | 3.610 | | | | | |
| 18 | 42.84626 | 7.798 | 1.496999 | 81.54 | 0.5375 | 0.8259 | |
| 19 | −169.05626 | D19 | | | | | |
| 20 | 57.88953 | 1.307 | 1.834810 | 42.74 | 0.5649 | 0.7533 | G3 |
| 21 | 35.92798 | 2.131 | | | | | |
| 22 | −37.88023 | 0.800 | 1.581439 | 40.75 | 0.5776 | 0.7501 | |
| 23 | 37.49064 | 0.337 | | | | | |
| 24 | 16.58610 | 2.467 | 1.922860 | 20.88 | 0.6390 | 0.6453 | |
| 25 | 83.52676 | 1.330 | | | | | |
| 26 | −115.98707 | 1.200 | 1.881000 | 40.14 | 0.5701 | 0.7329 | |
| 27 | 18.05485 | D27 | | | | | |

TABLE 3B

Example 2

| Sn | R | D | Nd | νd | θgF | θCt | |
|---|---|---|---|---|---|---|---|
| 28 | ∞ | D28 | (Aperture stop) | | | | |
| 29 | 98.24673 | 2.447 | 1.800000 | 29.84 | 0.6018 | 0.6874 | G4 |
| 30 | −49.83151 | 0.100 | | | | | |
| 31 | 24.66453 | 4.268 | 1.496999 | 81.54 | 0.5375 | 0.8259 | |
| 32 | −21.29301 | 1.500 | 1.592701 | 35.31 | 0.5934 | 0.7210 | |
| 33 | −59.34018 | 0.454 | | | | | |
| 34 | 401.30492 | 1.500 | 1.592701 | 35.31 | 0.5934 | 0.7210 | |
| 35 | 10.71644 | 3.773 | 1.496999 | 81.54 | 0.5375 | 0.8259 | |
| 36 | 157.27622 | D36 | | | | | |
| 37 | −24.00887 | 1.000 | 1.903660 | 31.31 | 0.5948 | 0.6968 | G5 |
| 38 | −87.91411 | 13.025 | | | | | |
| 39 | −143.76477 | 2.326 | 1.922860 | 20.88 | 0.6390 | 0.6453 | |
| 40 | −23.08060 | 0.100 | | | | | |
| 41 | 18.18113 | 1.259 | 1.922860 | 20.88 | 0.6390 | 0.6453 | |

TABLE 3B-continued

Example 2

| Sn | R | D | Nd | vd | θgF | θCt |
|---|---|---|---|---|---|---|
| 42 | 13.21720 | 1.882 | | | | |
| 43 | 36.24782 | 1.000 | 1.496999 | 81.54 | 0.5375 | 0.8259 |
| 44 | 15.52149 | 7.466 | | | | |
| 45 | −10.19664 | 1.000 | 1.496999 | 81.54 | 0.5375 | 0.8259 |
| 46 | −24.87527 | 0.100 | | | | |
| 47 | 15.62536 | 4.212 | 1.738000 | 32.26 | 0.5900 | 0.7148 |
| 48 | −14.72972 | 1.000 | 1.92286 | 20.88 | 0.639 | 0.6453 |
| 49 | −106.05804 | 2.000 | | | | |
| 50 | ∞ | 1.000 | 1.516800 | 64.20 | 0.5343 | 0.8682 |
| 51 | ∞ | | | | | |

TABLE 4

Example 2

| | WIDE | MIDDLE | TELE |
|---|---|---|---|
| |Focal length| | 490.062 | 1225.155 | 1960.247 |
| FNo. | 5.000 | 6.805 | 10.896 |
| Image Height | 4.450 | 4.450 | 4.450 |
| Half angle of view | 0.524 | 0.210 | 0.131 |
| D19 | 9.999 | 26.454 | 31.764 |
| D27 | 27.363 | 10.908 | 5.598 |
| D28 | 17.312 | 10.570 | 5.178 |
| D36 | 5.888 | 12.630 | 18.022 |

Example 3

Figure 7:
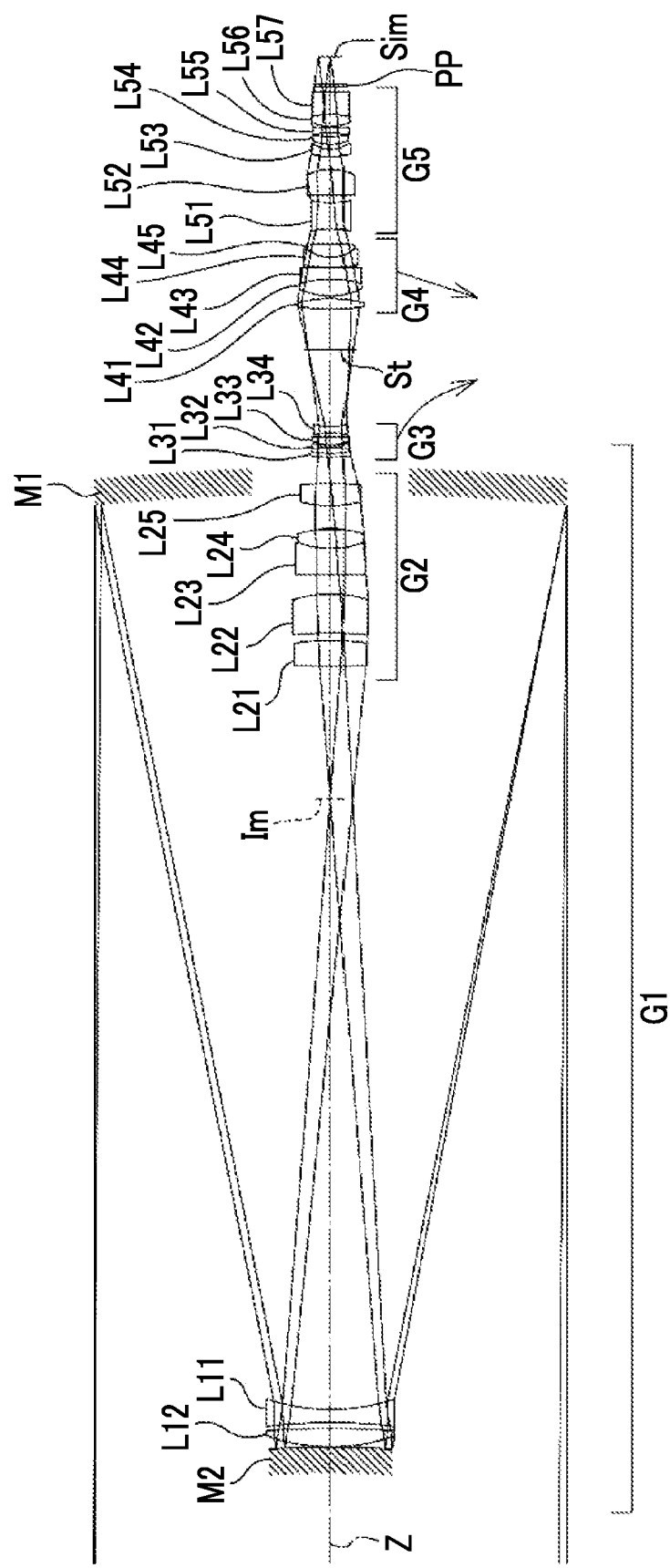
FIG. 7 is a cross-sectional view illustrating a configuration and an optical path at the wide angle end of the variable magnification optical system of Example 3.
Figure 8:
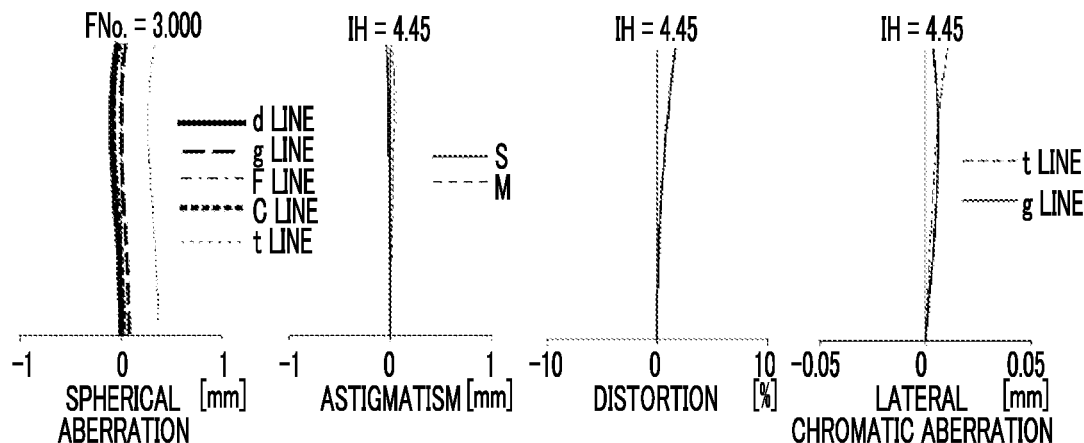
FIG. 8 is a diagram of aberrations of the variable magnification optical system of Example 3.
Figure 8:
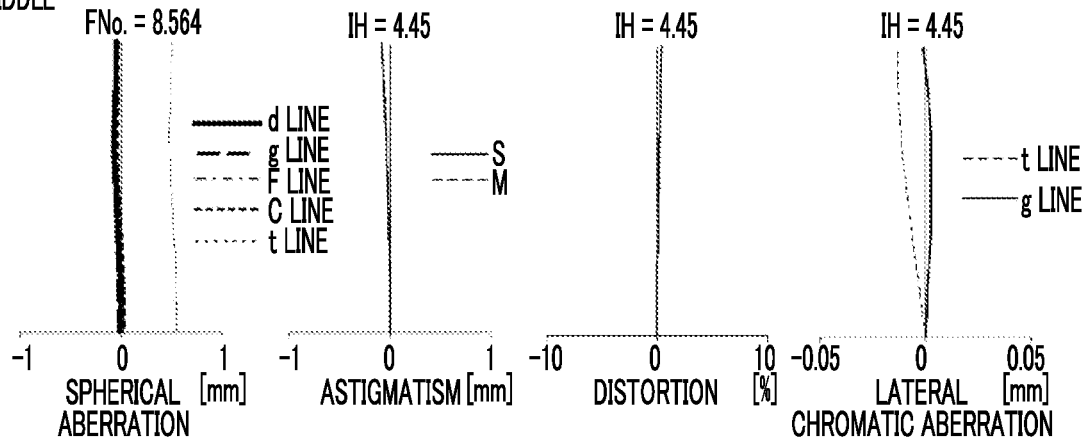
Figure 8:
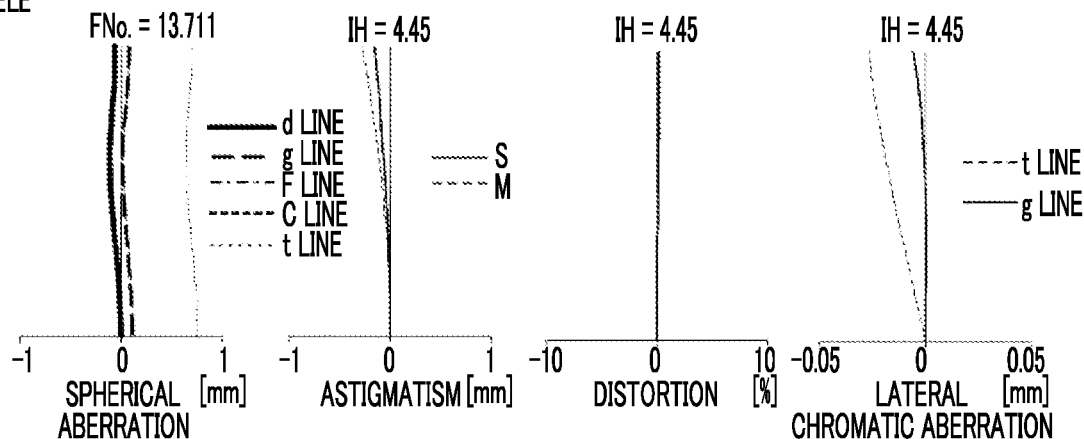

FIG. 7 shows a cross-sectional view and the optical path of the variable magnification optical system of Example 3. The variable magnification optical system of Example 3 has the same configuration as the outline of the variable magnification optical system of Example 1 except that the fourth group G4 consists of lenses L41 to L45 and the fifth group G5 consists of lenses L51 to L57. Regarding the variable magnification optical system of Example 3, Tables 5A and 5B show basic lens data, Table 6 shows specifications and variable surface spacings, and FIG. 8 shows a diagram of aberrations.

TABLE 5A

Example 3

| Sn | R | D | Nd | vd | θgF | θCt | |
|---|---|---|---|---|---|---|---|
| 1 | −909.17394 | −348.494 | (Reflective surface) | | | | G1 |
| 2 | 74.50487 | −5.000 | 1.516800 | 64.20 | 0.5343 | 0.8682 | |
| 3 | −204.98541 | −2.252 | | | | | |
| 4 | −329.95863 | −7.072 | 1.516800 | 64.20 | 0.5343 | 0.8682 | |
| 5 | 71.18716 | −0.100 | | | | | |
| 6 | −378.70578 | 0.100 | (Reflective surface) | | | | |
| 7 | 71.18716 | 7.072 | 1.516800 | 64.20 | 0.5343 | 0.8682 | |
| 8 | −329.95863 | 2.252 | | | | | |
| 9 | −204.98541 | 5.000 | 1.516800 | 64.20 | 0.5343 | 0.8682 | |
| 10 | 74.50487 | 282.757 | | | | | |
| 11 | 500.10078 | 9.914 | 1.516800 | 64.20 | 0.5343 | 0.8682 | G2 |
| 12 | −88.12425 | 2.802 | | | | | |
| 13 | −147.40955 | 14.828 | 1.516800 | 64.20 | 0.5343 | 0.8682 | |
| 14 | −48.26016 | 7.468 | | | | | |
| 15 | 774.46752 | 10.000 | 1.900430 | 37.37 | 0.5772 | 0.7219 | |
| 16 | 33.12265 | 7.305 | 1.496999 | 81.54 | 0.5375 | 0.8259 | |
| 17 | −47.02487 | 8.806 | | | | | |
| 18 | 47.68363 | 8.388 | 1.496999 | 81.54 | 0.5375 | 0.8259 | |
| 19 | −164.03762 | D19 | | | | | |
| 20 | 66.90744 | 1.446 | 1.772499 | 49.60 | 0.5521 | 0.7956 | G3 |
| 21 | 33.19409 | 2.423 | | | | | |
| 22 | −38.80665 | 0.800 | 1.593490 | 67.00 | 0.5367 | 0.8494 | |
| 23 | 44.94321 | 0.150 | | | | | |
| 24 | 18.09799 | 2.843 | 1.922860 | 20.88 | 0.6390 | 0.6453 | |
| 25 | 175.30291 | 1.552 | | | | | |
| 26 | −54.55665 | 2.576 | 1.800000 | 29.84 | 0.6018 | 0.6874 | |
| 27 | 19.56115 | D27 | | | | | |

TABLE 5B

Example 3

| Sn | R | D | Nd | vd | θgF | θCt | |
|---|---|---|---|---|---|---|---|
| 28 | ∞ | D28 | (Aperture stop) | | | | |
| 29 | 77.01399 | 4.052 | 1.804398 | 39.59 | 0.5730 | 0.7442 | G4 |
| 30 | −51.87136 | 1.004 | | | | | |
| 31 | 25.74360 | 6.430 | 1.496999 | 81.54 | 0.5375 | 0.8259 | |
| 32 | −40.68798 | 4.315 | 1.805181 | 25.42 | 0.6162 | 0.6680 | |
| 33 | 1127.80707 | 0.229 | | | | | |
| 34 | 65.53926 | 3.481 | 1.670029 | 47.23 | 0.5628 | 0.7659 | |
| 35 | 13.82049 | 5.160 | 1.496999 | 81.54 | 0.5375 | 0.8259 | |
| 36 | −132.34855 | D36 | | | | | |
| 37 | −27.29200 | 10.000 | 1.910820 | 35.25 | 0.5822 | 0.7131 | G5 |
| 38 | 32.07050 | 2.763 | | | | | |
| 39 | 1392.15675 | 10.000 | 1.800000 | 29.84 | 0.6018 | 0.6874 | |
| 40 | −19.22546 | 4.681 | | | | | |
| 41 | 23.22652 | 2.871 | 1.900430 | 37.37 | 0.5772 | 0.7219 | |
| 42 | 10.31332 | 1.955 | | | | | |
| 43 | 16.04654 | 2.977 | 1.517417 | 52.43 | 0.5565 | 0.7993 | |
| 44 | 43.73189 | 1.480 | | | | | |
| 45 | −25.56383 | 2.184 | 1.699300 | 51.11 | 0.5552 | 0.7594 | |
| 46 | −227.05811 | 0.100 | | | | | |
| 47 | 15.15673 | 4.742 | 1.670029 | 47.23 | 0.5628 | 0.7659 | |
| 48 | −28.19160 | 8.664 | 1.90043 | 37.37 | 0.5772 | 0.7219 | |
| 49 | −251.00722 | 2.000 | | | | | |
| 50 | ∞ | 1.000 | 1.5168 | 64.2 | 0.5343 | 0.8682 | |
| 51 | ∞ | | | | | | |

TABLE 6

Example 3

| | WIDE | MIDDLE | TELE |
|---|---|---|---|
| \|Focal length\| | 616.772 | 1541.929 | 2467.086 |
| FNo. | 3.000 | 8.564 | 13.711 |
| Image Height | 4.450 | 4.450 | 4.450 |
| Half angle of view | 0.406 | 0.165 | 0.103 |
| D19 | 10.001 | 26.556 | 33.669 |
| D27 | 29.439 | 12.884 | 5.771 |
| D28 | 15.415 | 8.469 | 5.149 |
| D36 | 5.750 | 12.696 | 16.016 |

Example 4

Figure 9:
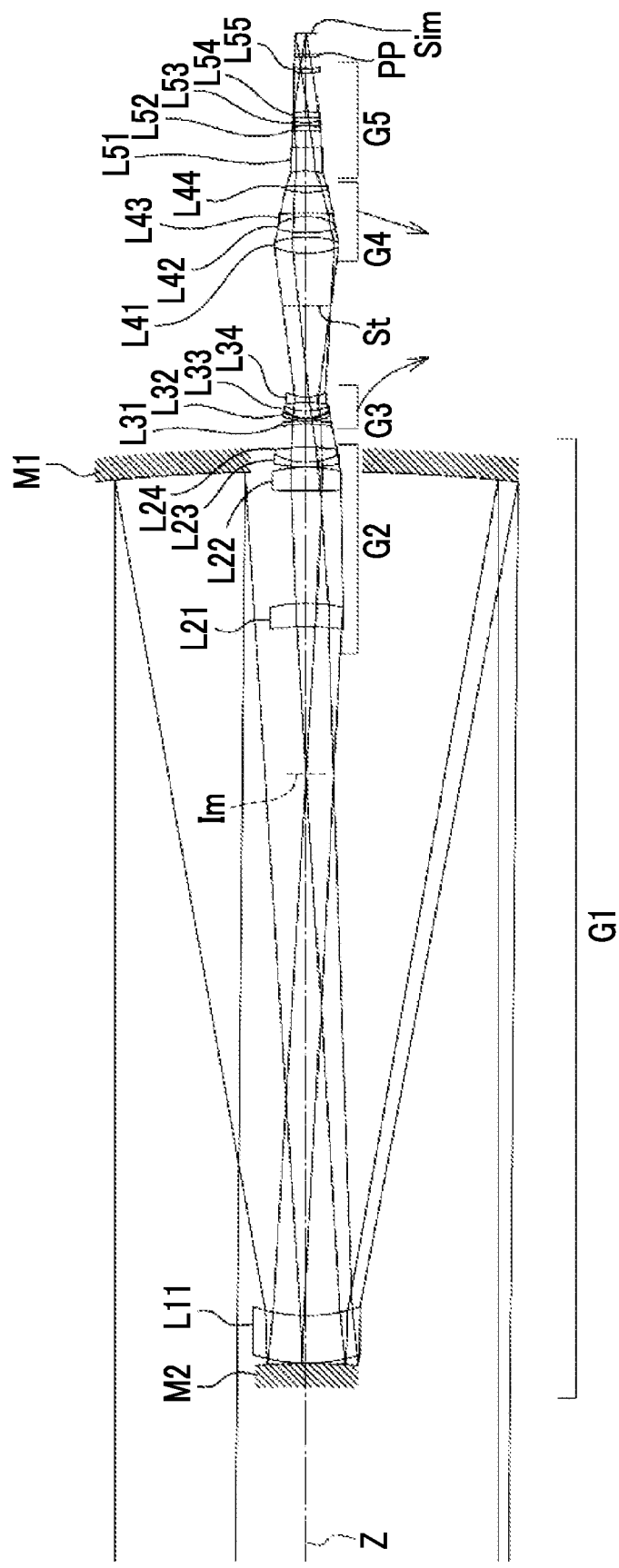
FIG. 9 is a cross-sectional view illustrating a configuration and an optical path at the wide angle end of the variable magnification optical system of Example 4.
Figure 10:
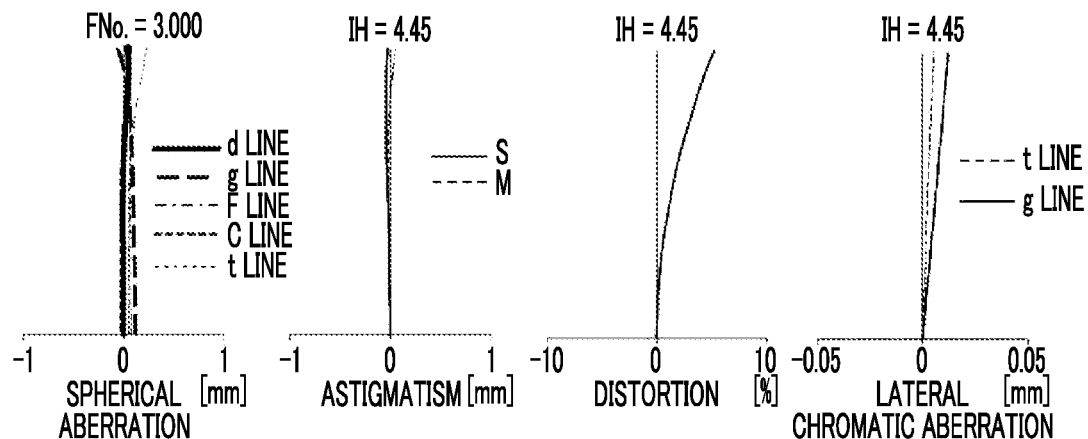
FIG. 10 is a diagram of aberrations of the variable magnification optical system of Example 4.
Figure 10:
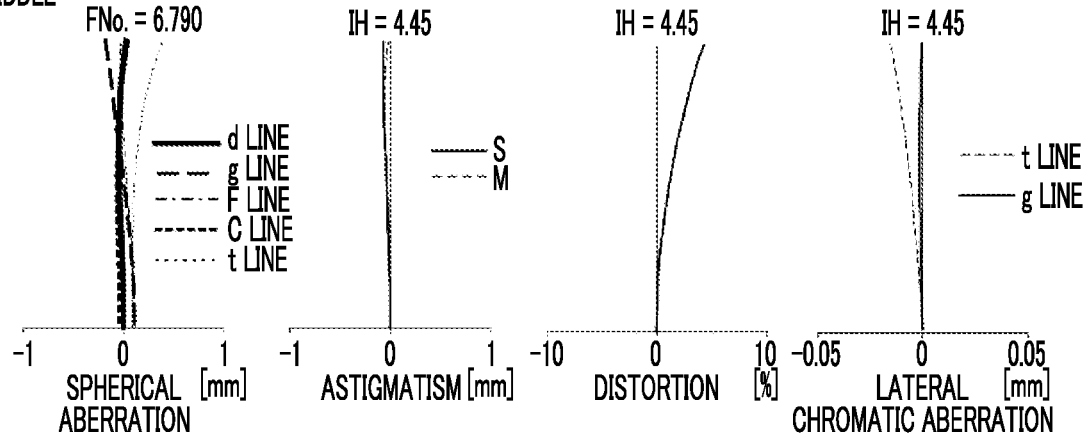
Figure 10:
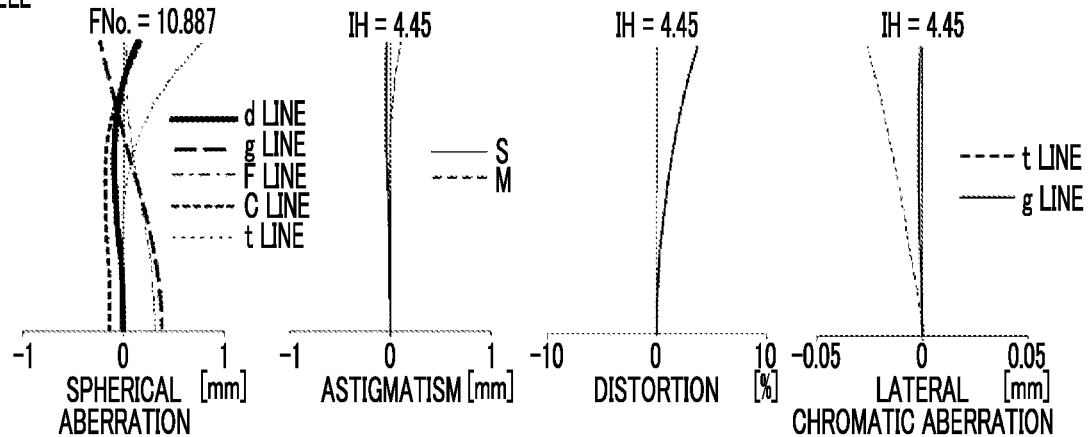

FIG. 9 shows a cross-sectional view and the optical path of the variable magnification optical system of Example 4. The variable magnification optical system of Example 4 has the same configuration as the outline of the variable magnification optical system of Example 1 except that the first group G1 consists of the ring-shaped first mirror M1, the second mirror M2 and the lens L11, and the second group G2 consists of the lenses L21 to L24. Regarding the variable magnification optical system of Example 4, Tables 7A and 7B show basic lens data, Table 8 shows specifications and variable surface spacings, and FIG. 10 shows a diagram of aberrations.

TABLE 7A

Example 4

| Sn | R | D | Nd | vd | θgF | θCt | |
|---|---|---|---|---|---|---|---|
| 1 | −905.87085 | −358.008 | (Reflective surface) | | | | G1 |
| 2 | 72.17805 | −20.000 | 1.516330 | 64.14 | 0.5353 | 0.8688 | |
| 3 | 74.06609 | −0.100 | | | | | |
| 4 | −266.20800 | 0.100 | (Reflective surface) | | | | |
| 5 | 74.06609 | 20.000 | 1.516330 | 64.14 | 0.5353 | 0.8688 | |
| 6 | 72.17805 | 292.115 | | | | | |
| 7 | −131.57767 | 10.000 | 1.603110 | 60.69 | 0.5411 | 0.8318 | G2 |
| 8 | −68.03842 | 47.569 | | | | | |
| 9 | 329.41192 | 10.000 | 1.592820 | 68.62 | 0.5441 | 0.7959 | |
| 10 | −62.75739 | 0.100 | | | | | |
| 11 | 70.79848 | 2.000 | 1.910820 | 35.25 | 0.5822 | 0.7131 | |
| 12 | 27.77604 | 6.338 | 1.496999 | 81.54 | 0.5375 | 0.8259 | |
| 13 | −101.23674 | D13 | | | | | |
| 14 | −58.15733 | 1.349 | 1.910820 | 35.25 | 0.5822 | 0.7131 | G3 |
| 15 | −67.63035 | 0.100 | | | | | |
| 16 | 30.13417 | 0.800 | 1.804000 | 46.53 | 0.5578 | 0.7716 | |
| 17 | 17.70172 | 0.100 | | | | | |
| 18 | 14.14831 | 3.199 | 1.922860 | 20.88 | 0.6390 | 0.6453 | |
| 19 | 21.24909 | 3.580 | | | | | |
| 20 | −60.01786 | 2.315 | 1.620041 | 36.26 | 0.5880 | 0.7267 | |
| 21 | 18.27581 | D21 | | | | | |

TABLE 7B

Example 4

| Sn | R | D | Nd | vd | θgF | θCt | |
|---|---|---|---|---|---|---|---|
| 22 | ∞ | D22 | (Aperture stop) | | | | |
| 23 | 36.47439 | 7.000 | 1.496999 | 81.54 | 0.5375 | 0.8259 | G4 |
| 24 | −42.56825 | 1.886 | | | | | |
| 25 | 53.74707 | 6.820 | 1.496999 | 81.54 | 0.5375 | 0.8259 | |
| 26 | −25.12509 | 1.500 | 1.834810 | 42.74 | 0.5649 | 0.7533 | |
| 27 | −176.83603 | 8.841 | | | | | |
| 28 | 35.62361 | 2.489 | 1.496999 | 81.54 | 0.5375 | 0.8259 | |
| 29 | 212.55411 | D29 | | | | | |
| 30 | −25.94271 | 10.000 | 1.851500 | 40.78 | 0.5696 | 0.7392 | G5 |
| 31 | 740.94317 | 7.242 | | | | | |
| 32 | −33.66981 | 2.040 | 1.921190 | 23.96 | 0.6203 | 0.6601 | |
| 33 | −18.40630 | 0.100 | | | | | |
| 34 | 93.24762 | 1.000 | 1.785896 | 44.20 | 0.5632 | 0.7638 | |
| 35 | 13.81323 | 2.152 | | | | | |
| 36 | 129.17158 | 2.773 | 1.496999 | 81.54 | 0.5375 | 0.8259 | |
| 37 | −17.74054 | 16.261 | | | | | |
| 38 | 18.78813 | 1.869 | 1.487490 | 70.24 | 0.5301 | 0.8924 | |
| 39 | 28.20185 | 5.000 | | | | | |
| 40 | ∞ | 1.000 | 1.516800 | 64.20 | 0.5343 | 0.8682 | |
| 41 | ∞ | | | | | | |

TABLE 8

Example 4

| | WIDE | MIDDLE | TELE |
|---|---|---|---|
| \|Focal length\| | 489.799 | 1224.497 | 1959.196 |
| FNo. | 3.000 | 6.790 | 10.887 |
| Image Height | 4.450 | 4.450 | 4.450 |
| Half angle of view | 0.492 | 0.199 | 0.125 |
| D13 | 9.999 | 35.651 | 42.215 |
| D21 | 38.970 | 13.318 | 6.754 |
| D22 | 21.856 | 13.391 | 5.033 |
| D29 | 6.646 | 15.111 | 23.469 |

Example 5

Figure 11:
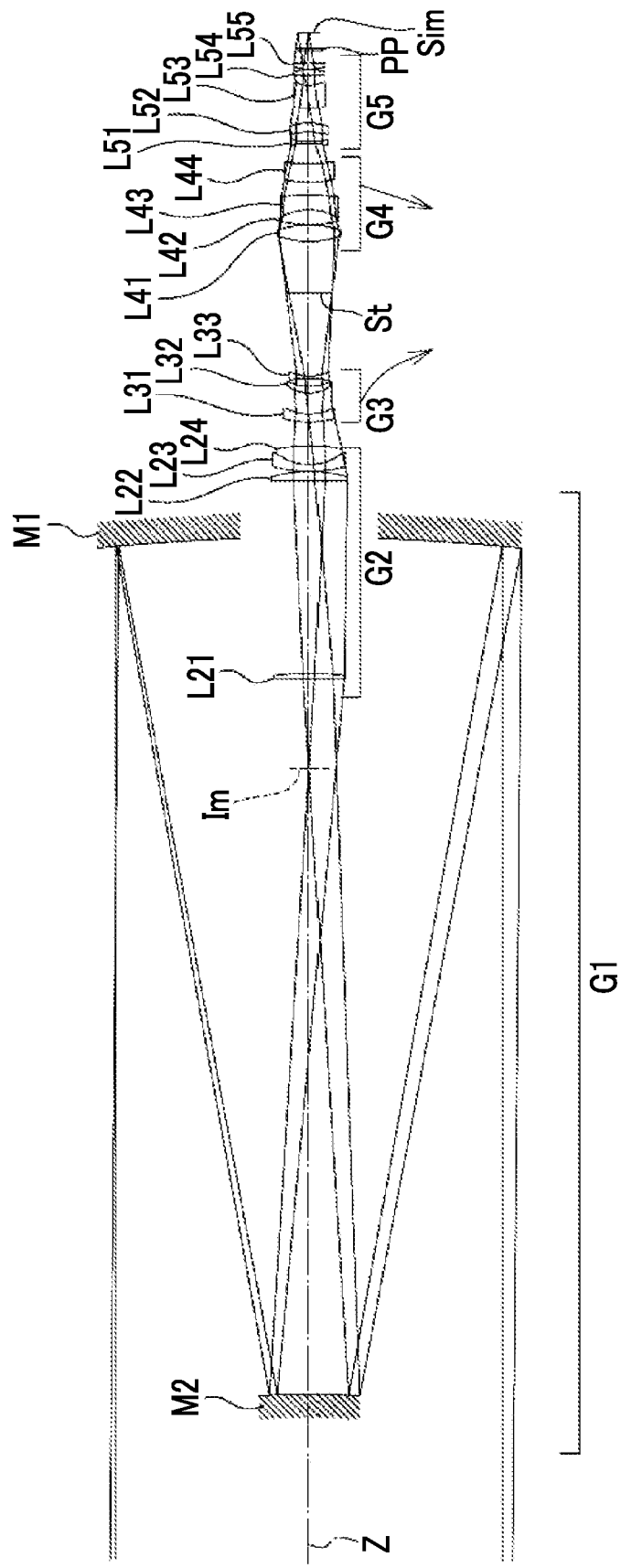
FIG. 11 is a cross-sectional view illustrating a configuration and an optical path at the wide angle end of the variable magnification optical system of Example 5.
Figure 12:
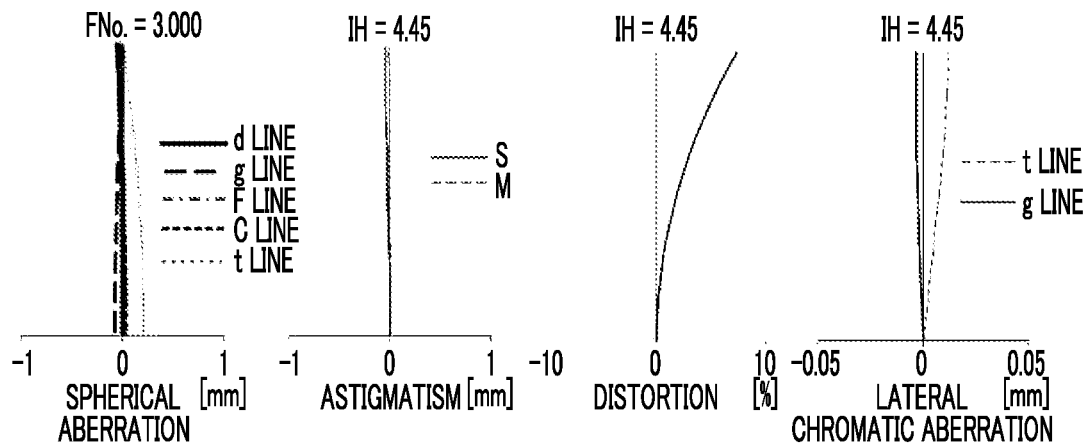
FIG. 12 is a diagram of aberrations of the variable magnification optical system of Example 5.
Figure 12:
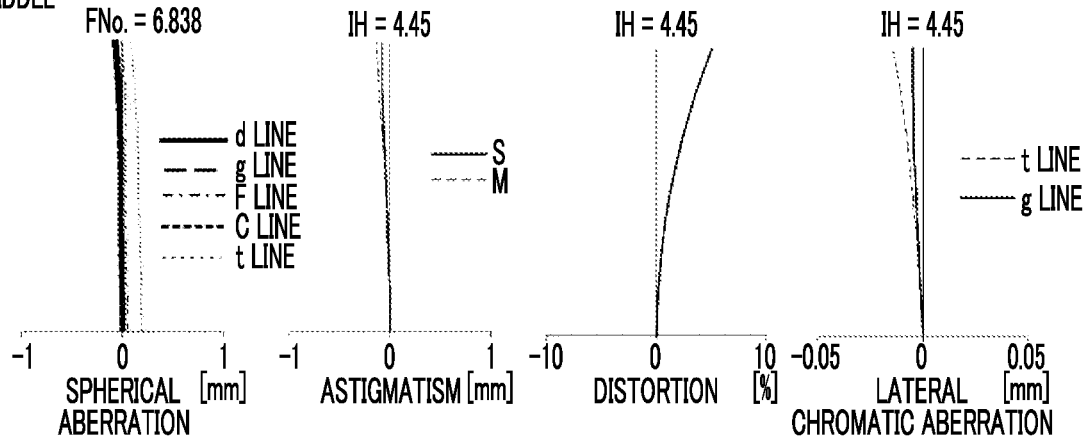
Figure 12:
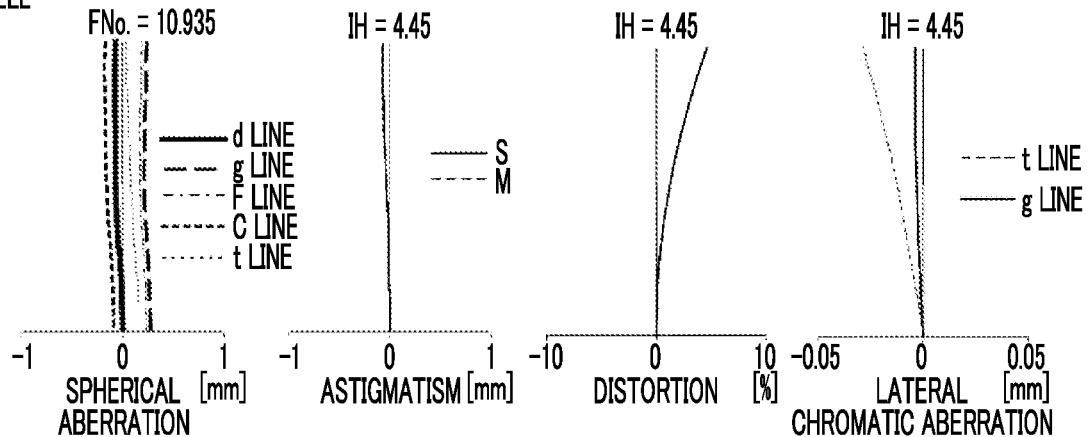

FIG. 11 shows a cross-sectional view and the optical path of the variable magnification optical system of Example 5. The variable magnification optical system of Example 5 has the same configuration as the outline of the variable magnification optical system of Example 1 except that the first group G1 consists of a ring-shaped first mirror M1 and the second mirror M2, the second group G2 consists of lenses L21 to L24, and the third group G3 consists of lenses L31 to L33. The variable magnification optical system of Example 5 has an aspherical surface. Regarding the variable magnification optical system of Example 5, Tables 9A and 9B show basic lens data, Table 10 shows specifications and variable surface spacings, Table 11 shows aspherical coefficients, and FIG. 12 shows a diagram of aberrations.

In the table of the basic lens data, a reference sign * is attached to surface numbers of aspherical surfaces, and numerical values of the paraxial curvature radius are written into the column of the curvature radius of the aspherical surface. In the table of aspherical coefficients, the row of Sn shows surface numbers of the aspherical surfaces, and the rows of KA and Am (m=4, 6, 8, 10) show numerical values of the aspherical coefficients for each aspherical surface. The "E±n" (n: an integer) in numerical values of the aspherical coefficients of Table 11 indicates "×10$^{±n}$". KA and Am are the aspherical coefficients in the aspherical expression represented by the following expression.

$$Zd = C \times h^2 / \{1 + (1-K) \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis and that is in contact with the vertex of the aspherical surface), h is a height (a distance from the optical axis to the lens surface), C is an inverse of the paraxial curvature radius, K and Am are aspherical coefficients, and Σ in the aspherical expression means the sum with respect to m.

TABLE 9A

Example 5

| Sn | R | D | Nd | vd | θgF | θCt | |
|---|---|---|---|---|---|---|---|
| 1* | −911.98707 | −362.473 | (Reflective surface) | | | | G1 |
| 2* | −288.09510 | 302.382 | (Reflective surface) | | | | |
| 3 | −978.56667 | 2.338 | 1.699300 | 51.11 | 0.5552 | 0.7594 | G2 |
| 4 | −117.34699 | 81.560 | | | | | |
| 5 | 1518.47504 | 3.918 | 1.622799 | 57.05 | 0.5464 | 0.8061 | |
| 6 | −56.32338 | 0.100 | | | | | |
| 7 | 61.09138 | 2.850 | 1.851500 | 40.78 | 0.5696 | 0.7392 | |
| 8 | 21.90423 | 8.018 | 1.496999 | 81.54 | 0.5375 | 0.8259 | |
| 9 | −70.67884 | D9 | | | | | |
| 10 | 39.67658 | 3.349 | 1.804000 | 46.53 | 0.5578 | 0.7716 | G3 |
| 11 | 19.75482 | 8.916 | | | | | |

TABLE 9A-continued

Example 5

| Sn | R | D | Nd | vd | θgF | θCt |
|---|---|---|---|---|---|---|
| 12 | 14.11719 | 2.929 | 1.922860 | 20.88 | 0.6390 | 0.6453 |
| 13 | 19.25594 | 3.147 | | | | |
| 14 | −66.55009 | 1.200 | 1.620041 | 36.26 | 0.5880 | 0.7267 |
| 15 | 19.59394 | D15 | | | | |

TABLE 9B

Example 5

| Sn | R | D | Nd | vd | θgF | θCt | |
|---|---|---|---|---|---|---|---|
| 16 | ∞ | D16 | (Aperture stop) | | | | |
| 17* | 38.81930 | 6.979 | 1.496999 | 81.54 | 0.5375 | 0.8259 | G4 |
| 18* | −38.51981 | 0.100 | | | | | |
| 19 | 48.24461 | 6.294 | 1.496999 | 81.54 | 0.5375 | 0.8259 | |
| 20 | −23.36027 | 6.152 | 1.834810 | 42.74 | 0.5649 | 0.7533 | |
| 21 | −190.98871 | 5.543 | | | | | |
| 22 | 40.18796 | 7.951 | 1.496999 | 81.54 | 0.5375 | 0.8259 | |
| 23 | 72.09696 | D23 | | | | | |
| 24 | −42.92156 | 1.000 | 1.851500 | 40.78 | 0.5696 | 0.7392 | G5 |
| 25 | 57.83883 | 3.797 | | | | | |
| 26 | −36.05074 | 4.028 | 1.921190 | 23.96 | 0.6203 | 0.6601 | |
| 27 | −19.58800 | 6.389 | | | | | |
| 28 | 111.67907 | 9.455 | 1.785896 | 44.20 | 0.5632 | 0.7638 | |
| 29 | 11.17794 | 4.182 | | | | | |
| 30 | 95.99603 | 2.445 | 1.496999 | 81.54 | 0.5375 | 0.8259 | |
| 31 | −27.24568 | 0.100 | | | | | |
| 32 | 16.37997 | 2.952 | 1.487490 | 70.24 | 0.5301 | 0.8924 | |
| 33 | −203.79027 | 5.000 | | | | | |
| 34 | ∞ | 1.000 | 1.516800 | 64.20 | 0.5343 | 0.8682 | |
| 35 | ∞ | | | | | | |

TABLE 10

Example 5

| | WIDE | MIDDLE | TELE |
|---|---|---|---|
| |Focal length| | 491.871 | 1229.679 | 1967.486 |
| FNo. | 3.000 | 6.838 | 10.935 |
| Image Height | 4.450 | 4.450 | 4.450 |
| Half angle of view | 0.480 | 0.196 | 0.123 |
| D9 | 10.060 | 32.472 | 39.600 |
| D15 | 35.149 | 12.737 | 5.609 |
| D16 | 21.715 | 12.876 | 5.671 |
| D23 | 8.591 | 17.430 | 24.635 |

TABLE 11

Example 5

| Sn | 1 | 2 | 17 | 18 |
|---|---|---|---|---|
| K | 1.0000000E+00 | 1.0000000E+00 | 1.0000000E+00 | 1.0000000E+00 |
| A4 | 3.9946630E−11 | −3.2967475E−08 | 1.7887796E−06 | 1.6326477E−06 |
| A6 | −1.6212908E−15 | 3.1231828E−11 | 3.0968098E−09 | −1.7555774E−09 |
| A8 | 0.0000000E+00 | 1.5217231E−14 | 8.4448496E−12 | 9.1089382E−12 |
| A10 | 0.0000000E+00 | −2.2660765E−17 | 2.0568262E−14 | −5.3080362E−15 |

Example 6

Figure 13:
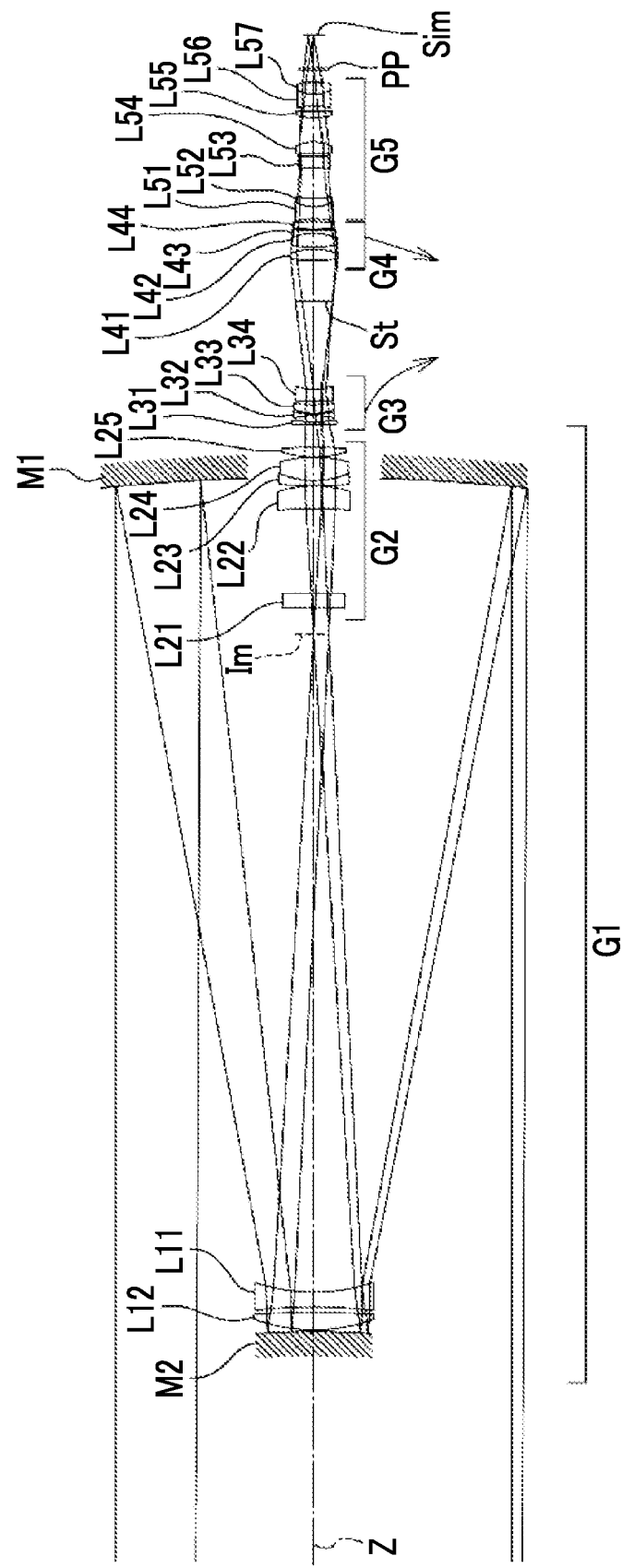
FIG. 13 is a cross-sectional view illustrating a configuration and an optical path at the wide angle end of the variable magnification optical system of Example 6.
Figure 14:
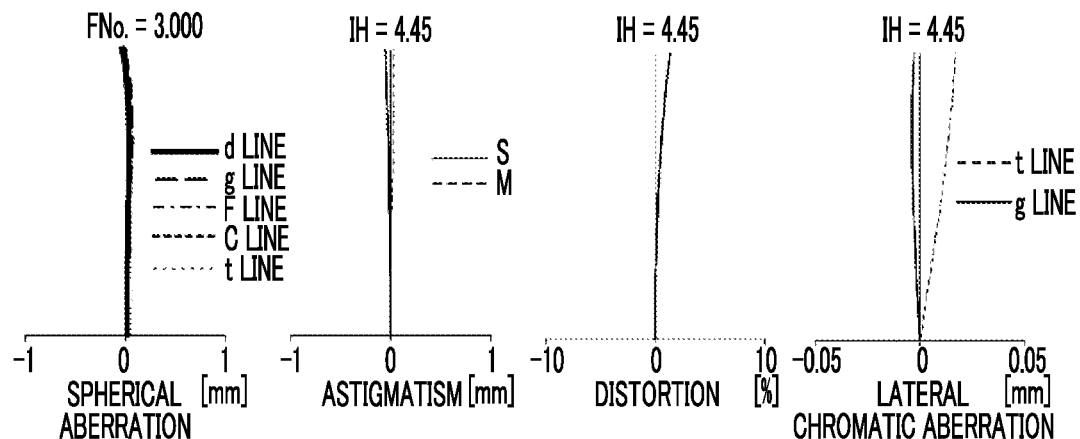
FIG. 14 is a diagram of aberrations of the variable magnification optical system of Example 6.
Figure 14:
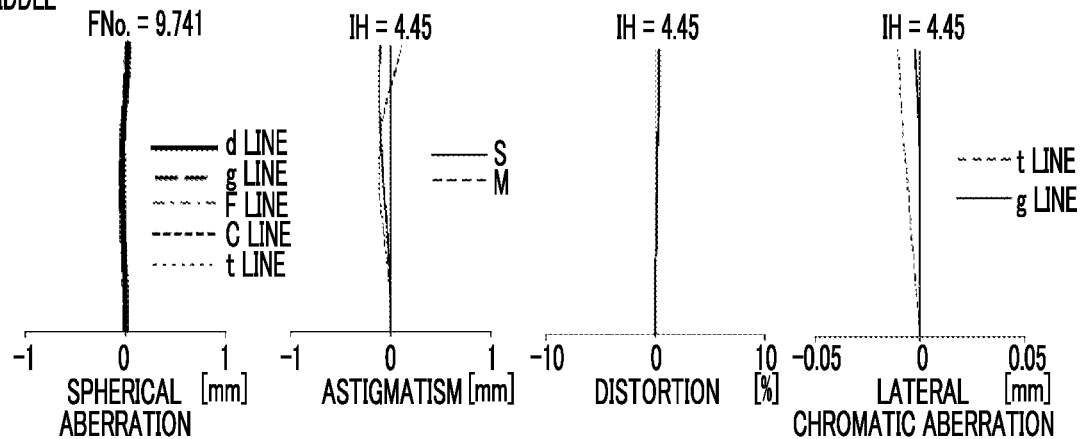
Figure 14:
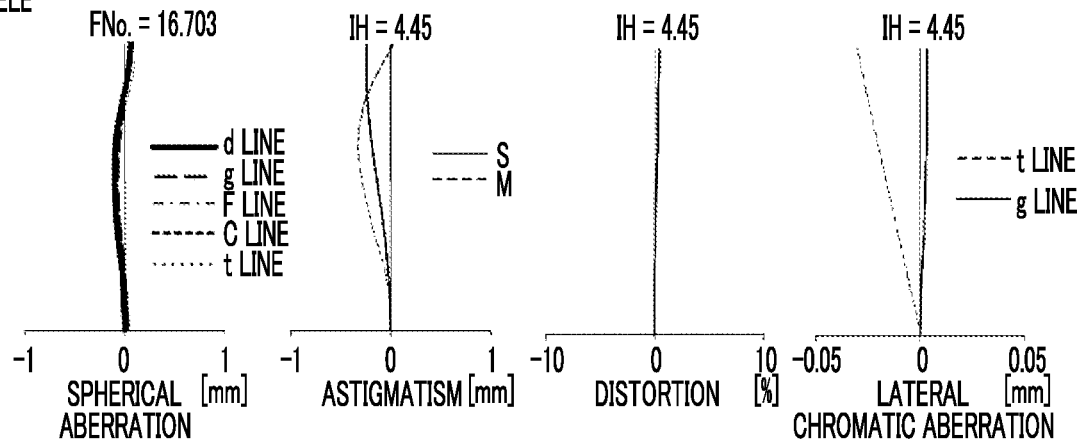

FIG. 13 shows a cross-sectional view and the optical path of the variable magnification optical system of Example 6. The variable magnification optical system of Example 6 has the same configuration as the outline of the variable magnification optical system of Example 1 except that the fifth group G5 consists of lenses L51 to L57. Regarding the variable magnification optical system of Example 6, Tables 12A and 12B show basic lens data, Table 13 shows specifications and variable surface spacings, and FIG. 14 shows a diagram of aberrations.

TABLE 12A

Example 6

| Sn | R | D | Nd | vd | θgF | θCt | |
|---|---|---|---|---|---|---|---|
| 1 | −907.40153 | −346.511 | (Reflective surface) | | | | G1 |
| 2 | 75.72578 | −6.223 | 1.516800 | 64.20 | 0.5343 | 0.8682 | |
| 3 | −194.27455 | −2.372 | | | | | |
| 4 | −328.44065 | −7.439 | 1.516800 | 64.20 | 0.5343 | 0.8682 | |
| 5 | 71.66613 | −0.439 | | | | | |
| 6 | −347.43189 | 0.439 | (Reflective surface) | | | | |
| 7 | 71.66613 | 7.439 | 1.516800 | 64.20 | 0.5343 | 0.8682 | |
| 8 | −328.44065 | 2.372 | | | | | |
| 9 | −194.27455 | 6.223 | 1.516800 | 64.20 | 0.5343 | 0.8682 | |
| 10 | 75.72578 | 291.352 | | | | | |
| 11 | −338.67117 | 6.033 | 1.496999 | 81.54 | 0.5375 | 0.8259 | G2 |
| 12 | −315.29120 | 35.589 | | | | | |
| 13 | −292.86202 | 10.000 | 1.639300 | 44.87 | 0.5684 | 0.7605 | |
| 14 | −45.06867 | 0.100 | | | | | |
| 15 | 219.36015 | 2.000 | 1.910820 | 35.25 | 0.5822 | 0.7131 | |
| 16 | 34.03656 | 10.010 | 1.496999 | 81.54 | 0.5375 | 0.8259 | |
| 17 | −52.82611 | 0.100 | | | | | |
| 18 | 42.82901 | 4.122 | 1.496999 | 81.54 | 0.5375 | 0.8259 | |
| 19 | −200.95256 | D19 | | | | | |
| 20 | 444.33505 | 1.200 | 1.772499 | 49.60 | 0.5521 | 0.7956 | G3 |
| 21 | 64.96505 | 2.534 | | | | | |
| 22 | −35.70094 | 0.800 | 1.712995 | 53.87 | 0.5459 | 0.8194 | |
| 23 | 37.77382 | 0.105 | | | | | |
| 24 | 19.27809 | 3.997 | 2.001000 | 29.13 | 0.5995 | 0.6835 | |
| 25 | 175.58193 | 1.629 | | | | | |
| 26 | −62.90391 | 4.238 | 1.719995 | 50.23 | 0.5521 | 0.7931 | |
| 27 | 18.63491 | D27 | | | | | |

TABLE 12B

Example 6

| Sn | R | D | Nd | vd | θgF | θCt | |
|---|---|---|---|---|---|---|---|
| 28 | ∞ | D28 | (Aperture stop) | | | | |
| 29 | 80.65886 | 4.697 | 1.496999 | 81.54 | 0.5375 | 0.8259 | G4 |
| 30 | −27.86306 | 0.823 | | | | | |
| 31 | 39.24411 | 6.050 | 1.496999 | 81.54 | 0.5375 | 0.8259 | |
| 32 | −22.30754 | 1.500 | 1.701536 | 41.24 | 0.5766 | 0.7431 | |
| 33 | 265.78916 | 0.100 | | | | | |
| 34 | 42.20814 | 3.479 | 1.496999 | 81.54 | 0.5375 | 0.8259 | |
| 35 | −90.03952 | D35 | | | | | |
| 36 | −39.15508 | 5.010 | 1.620041 | 36.26 | 0.5880 | 0.7267 | G5 |
| 37 | 14.02366 | 3.539 | 1.846660 | 23.78 | 0.6192 | 0.6599 | |
| 38 | 29.68060 | 12.954 | | | | | |
| 39 | −86.96502 | 5.000 | 1.834810 | 42.72 | 0.5648 | 0.7544 | |
| 40 | 33.55298 | 1.160 | | | | | |
| 41 | 81.82718 | 5.000 | 1.548141 | 45.78 | 0.5686 | 0.7686 | |
| 42 | −18.09563 | 10.380 | | | | | |
| 43 | 29.88164 | 2.797 | 1.592701 | 35.31 | 0.5934 | 0.7210 | |
| 44 | 303.85324 | 2.187 | | | | | |
| 45 | −35.50885 | 5.010 | 1.846660 | 23.78 | 0.6192 | 0.6599 | |
| 46 | 14.08580 | 5.000 | 2.000690 | 25.46 | 0.6136 | 0.6667 | |
| 47 | −126.20679 | 5.000 | | | | | |
| 48 | ∞ | 1.000 | 1.5168 | 64.2 | 0.5343 | 0.8682 | |
| 49 | ∞ | | | | | | |

TABLE 13

Example 6

| | WIDE | MIDDLE | TELE |
|---|---|---|---|
| \|Focal length\| | 500.915 | 1753.203 | 3005.490 |
| FNo. | 3.000 | 9.741 | 16.703 |
| Image Height | 4.450 | 4.450 | 4.450 |
| Half angle of view | 0.500 | 0.145 | 0.084 |
| D19 | 9.759 | 34.086 | 41.497 |

TABLE 13-continued

Example 6

| | WIDE | MIDDLE | TELE |
|---|---|---|---|
| D27 | 37.688 | 13.361 | 5.950 |
| D28 | 17.191 | 8.914 | 5.020 |
| D35 | 1.186 | 9.463 | 13.357 |

Example 7

Figure 15:
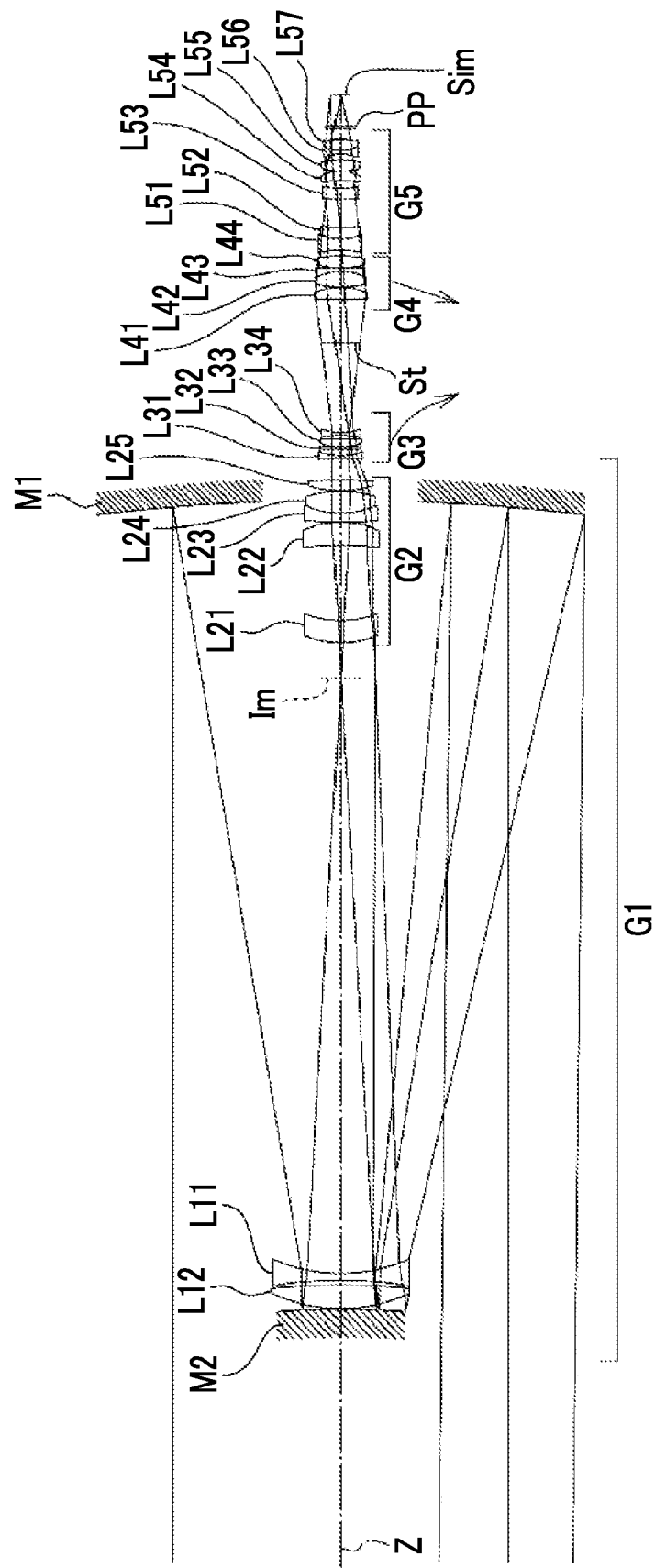
FIG. 15 is a cross-sectional view illustrating a configuration and an optical path at the wide angle end of the variable magnification optical system of Example 7.
Figure 16:
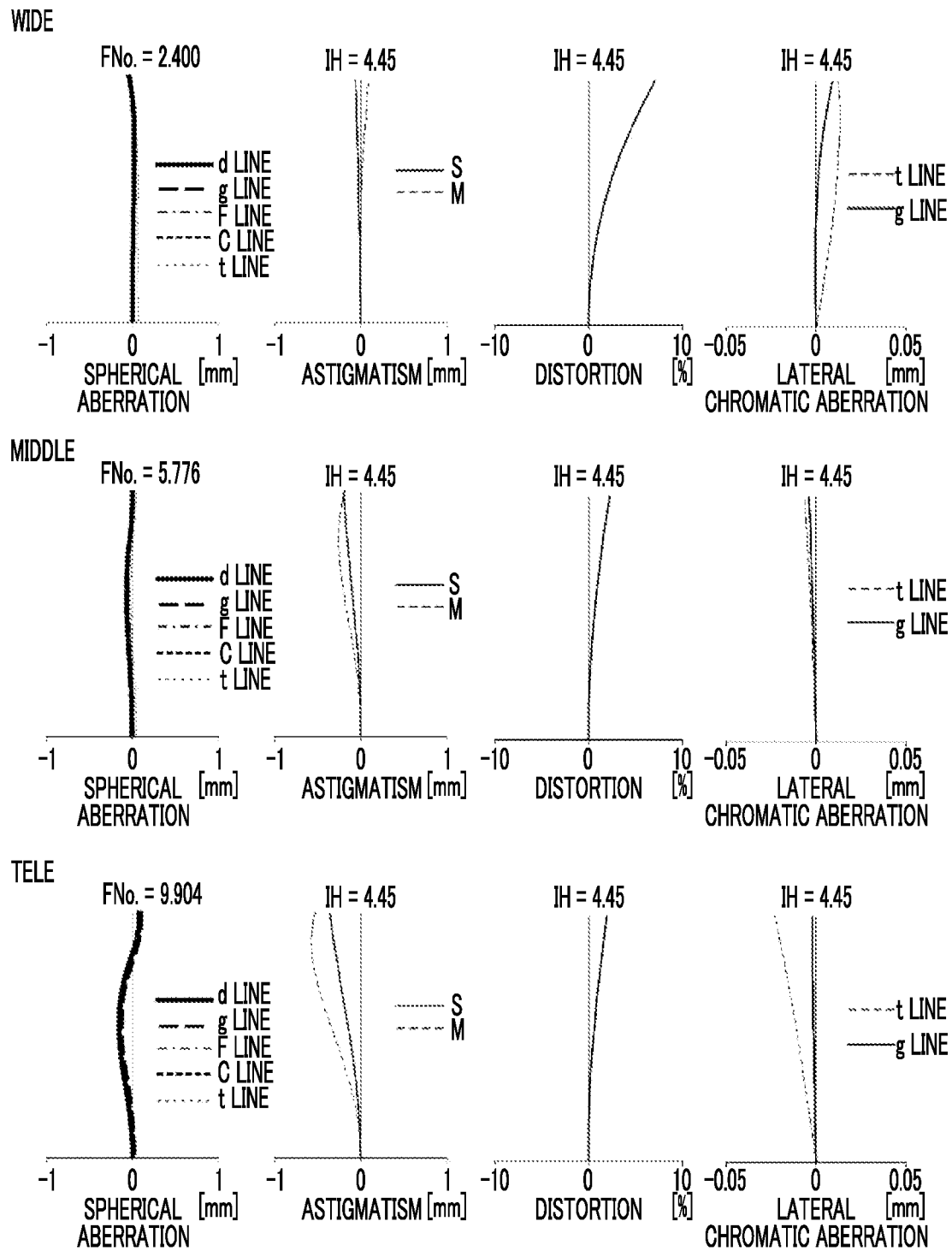
FIG. 16 is a diagram of aberrations of the variable magnification optical system of Example 7.

FIG. 15 shows a cross-sectional view and the optical path of the variable magnification optical system of Example 7. The variable magnification optical system of Example 7 has the same configuration as the outline of the variable magnification optical system of Example 1 except that the fifth group G5 consists of lenses L51 to L57. Regarding the variable magnification optical system of Example 7, Tables 14A and 14B show basic lens data, Table 15 shows specifications and variable surface spacings, and FIG. 16 shows a diagram of aberrations.

TABLE 14A

Example 7

| Sn | R | D | Nd | νd | θgF | θCt | |
|---|---|---|---|---|---|---|---|
| 1 | −903.89485 | −348.304 | (Reflective surface) | | | | G1 |
| 2 | 75.81334 | −3.144 | 1.516800 | 64.20 | 0.5343 | 0.8682 | |
| 3 | −193.28422 | −2.164 | | | | | |
| 4 | −329.64455 | −10.672 | 1.516800 | 64.20 | 0.5343 | 0.8682 | |
| 5 | 71.98668 | −0.141 | | | | | |
| 6 | −340.97202 | 0.141 | (Reflective surface) | | | | |
| 7 | 71.98668 | 10.672 | 1.516800 | 64.20 | 0.5343 | 0.8682 | |
| 8 | −329.64455 | 2.164 | | | | | |
| 9 | −193.28422 | 3.144 | 1.516800 | 64.20 | 0.5343 | 0.8682 | |
| 10 | 75.81334 | 284.199 | | | | | |
| 11 | 44.21317 | 10.000 | 1.496999 | 81.54 | 0.5375 | 0.8259 | G2 |
| 12 | 44.68030 | 34.052 | | | | | |
| 13 | −125.69302 | 10.000 | 1.639300 | 44.87 | 0.5684 | 0.7605 | |
| 14 | −44.57161 | 0.100 | | | | | |
| 15 | 191.38587 | 4.000 | 1.910820 | 35.25 | 0.5822 | 0.7131 | |
| 16 | 36.46981 | 10.010 | 1.496999 | 81.54 | 0.5375 | 0.8259 | |
| 17 | −50.53857 | 0.218 | | | | | |
| 18 | 45.31695 | 4.806 | 1.496999 | 81.54 | 0.5375 | 0.8259 | |
| 19 | −232.49903 | D19 | | | | | |
| 20 | −88.86529 | 1.200 | 1.772499 | 49.60 | 0.5521 | 0.7956 | G3 |
| 21 | 27.95860 | 2.848 | | | | | |
| 22 | −127.81937 | 0.800 | 1.712995 | 53.87 | 0.5459 | 0.8194 | |
| 23 | 89.23956 | 0.100 | | | | | |
| 24 | 20.86652 | 3.734 | 2.001000 | 29.13 | 0.5995 | 0.6835 | |
| 25 | −5398.91136 | 1.623 | | | | | |
| 26 | −52.76398 | 1.200 | 1.719995 | 50.23 | 0.5521 | 0.7931 | |
| 27 | 20.92593 | D27 | | | | | |

TABLE 14B

Example 7

| Sn | R | D | Nd | νd | θgF | θCt | |
|---|---|---|---|---|---|---|---|
| 28 | ∞ | D28 | (Aperture stop) | | | | |
| 29 | 295.06547 | 5.484 | 1.496999 | 81.54 | 0.5375 | 0.8259 | G4 |
| 30 | −27.90617 | 0.100 | | | | | |
| 31 | 53.29043 | 7.148 | 1.496999 | 81.54 | 0.5375 | 0.8259 | |
| 32 | −22.15226 | 1.500 | 1.701536 | 41.24 | 0.5766 | 0.7431 | |
| 33 | 271.37899 | 0.100 | | | | | |
| 34 | 39.54243 | 4.971 | 1.496999 | 81.54 | 0.5375 | 0.8259 | |
| 35 | −60.50380 | D35 | | | | | |
| 36 | −37.42903 | 5.010 | 1.620041 | 36.26 | 0.5880 | 0.7267 | G5 |
| 37 | 18.37925 | 5.000 | 1.846660 | 23.78 | 0.6192 | 0.6599 | |
| 38 | 51.50247 | 13.003 | | | | | |
| 39 | 146.84969 | 5.000 | 1.834810 | 42.72 | 0.5648 | 0.7544 | |
| 40 | 29.46771 | 3.598 | | | | | |
| 41 | −42.77218 | 4.246 | 1.548141 | 45.78 | 0.5686 | 0.7686 | |
| 42 | −16.19477 | 0.100 | | | | | |
| 43 | 40.97477 | 5.000 | 1.592701 | 35.31 | 0.5934 | 0.7210 | |
| 44 | −33.85250 | 2.557 | | | | | |
| 45 | −19.83534 | 1.510 | 1.846660 | 23.78 | 0.6192 | 0.6599 | |

TABLE 14B-continued

Example 7

| Sn | R | D | Nd | νd | θgF | θCt |
|---|---|---|---|---|---|---|
| 46 | 14.18802 | 4.980 | 2.000690 | 25.46 | 0.6136 | 0.6667 |
| 47 | −74.42343 | 5.000 | | | | |
| 48 | ∞ | 1.000 | 1.5168 | 64.2 | 0.5343 | 0.8682 |
| 49 | ∞ | | | | | |

TABLE 15

Example 7

| | WIDE | MIDDLE | TELE |
|---|---|---|---|
| |Focal length| | 362.954 | 1270.341 | 2177.727 |
| FNo. | 2.400 | 5.776 | 9.904 |
| Image Height | 4.450 | 4.450 | 4.450 |
| Half angle of view | 0.651 | 0.196 | 0.115 |
| D19 | 9.887 | 36.421 | 43.839 |
| D27 | 40.434 | 13.900 | 6.482 |
| D28 | 19.474 | 10.138 | 4.874 |
| D35 | 2.500 | 11.836 | 17.100 |

Table 16 shows corresponding values of Conditional Expressions (1) to (11) of the variable magnification optical system of Examples 1 to 7. The corresponding values other than the partial dispersion ratios in Table 16 are values based on the d line.

TABLE 16

| Expression Number | | Example 1 | Example 2 | Example 3 | Example 4 | Example 5 | Example 6 | Example 7 |
|---|---|---|---|---|---|---|---|---|
| (1) | \|fT/f1\| | 1.54 | 1.71 | 2.16 | 1.48 | 1.51 | 2.19 | 1.61 |
| (2) | β2 | −1.19 | −1.17 | −1.18 | −1.23 | −1.09 | −1.40 | −1.26 |
| (3) | f3/f4 | −0.76 | −0.81 | −0.78 | −0.89 | −0.82 | −0.71 | −0.68 |
| (4) | β3T/β3W | 2.259 | 2.008 | 2.238 | 1.762 | 1.991 | 2.810 | 2.725 |
| (5) | β4T/β4W | 1.771 | 1.992 | 1.787 | 2.271 | 2.009 | 2.135 | 2.201 |
| (6) | (β3T/β3W)/(β4T/β4W) | 1.276 | 1.009 | 1.252 | 0.776 | 0.991 | 1.316 | 1.238 |
| (7) | β5W | 1.37 | 1.60 | 1.91 | 1.90 | 1.58 | 1.69 | 1.38 |
| (8) | θgF2P−θgF2N | −0.0329 | −0.0463 | −0.0413 | −0.0413 | −0.0232 | −0.0370 | −0.0370 |
| (9) | θCt2P−θCt2N | 0.1010 | 0.1340 | 0.1250 | 0.1050 | 0.0580 | 0.0960 | 0.0960 |
| (10) | θgF4P−θgF4N | −0.0390 | −0.0345 | −0.0402 | −0.0274 | −0.0274 | −0.0391 | −0.0391 |
| (11) | θCt4P−θCt4N | 0.0910 | 0.0590 | 0.0820 | 0.0730 | 0.0730 | 0.0830 | 0.0830 |

As can be seen from the above data, the variable magnification optical systems of Examples 1 to 7 are catadioptric optical systems, where there is only one large-diameter optical element of which the focal length at the telephoto end is 1000 mm (millimeters) or more and the diameter is greater than 100 mm (millimeters). As a result, the weight thereof is reduced. Further, the variable magnification optical systems of Examples 1 to 7 have a magnification ratio of 3.9 times or more, have an aperture stop St which remains stationary, and can be miniaturized while ensuring the long focal length as described above. As a result, various aberrations are satisfactorily corrected in a wide range from the visible light region to the near infrared light region, and high optical performance is achieved.

Figure 17:
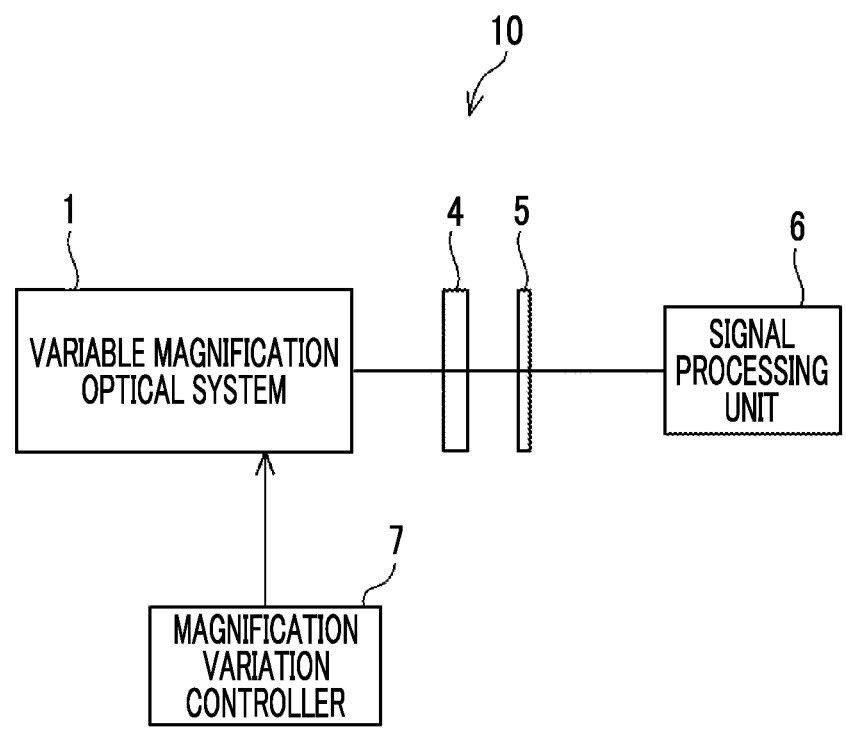
FIG. 17 is a schematic configuration diagram of an imaging apparatus according to an embodiment.

Next, an imaging apparatus according to an embodiment of the present disclosure will be described. FIG. 17 shows a schematic configuration diagram of an imaging apparatus 10 using the variable magnification optical system 1 according to the embodiment of the present disclosure as an example of the imaging apparatus according to the embodiment of the present disclosure. Examples of the imaging apparatus 10 include a surveillance camera, a video camera, an electronic still camera, and the like.

The imaging apparatus 10 comprises the variable magnification optical system 1, a filter 4 that is disposed on the image side of the variable magnification optical system 1, an imaging element 5 that is disposed on the image side of the filter 4, a signal processing unit 6 that performs arithmetic processing on an output signal from the imaging element 5, and a magnification variation controller 7 that controlling the magnification variation of the variable magnification optical system 1.

The imaging element 5 converts an optical image formed by the variable magnification optical system 1 into an electric signal. As the imaging element 5, for example, a charge coupled device (CCD) or a complementary metal oxide semiconductor (CMOS) or the like can be used. The imaging element 5 is disposed such that the imaging surface thereof coincides with the image plane of the variable magnification optical system 1. Although FIG. 17 shows only one imaging element 5, the imaging apparatus 10 may be configured to comprise a plurality of imaging elements.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each optical element are not limited to the values shown in the numerical examples, and different values may be used therefor.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. A variable magnification optical system comprising: as groups having powers, only five groups consisting of, in order from an object side to an image side along an optical path, a first group that has a positive power, a second group that has a positive power, a third group that has a negative power, a fourth group that has a positive power, and a fifth group that has a positive power,
wherein the first group is an optical element that has a power positioned closest to the object side on the optical path, and includes a first mirror that has a concave reflective surface facing toward the object side and a second mirror that reflects light, which is directed from the first mirror toward the object side, toward the image side and that has a convex reflective surface facing toward the image side,
an intermediate image is formed in the optical path between the first group and the second group,
the second group, the third group, and the fourth group are refractive optical systems,
a stop is disposed between the third group and the fourth group,
during changing magnification from a wide angle end to a telephoto end, the first mirror, the second mirror, the second group, the stop, and the fifth group remain stationary with respect to an image plane, the third group moves to the image side, and the fourth group moves to the object side, and
the fourth group includes a biconvex lens that is disposed closest to the object side and a cemented lens that is disposed closer to the image side than the biconvex lens and formed by cementing two lenses including a positive lens and a negative lens.

2. The variable magnification optical system according to claim 1,
wherein the first group remains stationary with respect to the image plane during changing magnification, and
assuming that
a focal length of the variable magnification optical system at the telephoto end is fT, and
a focal length of the first group is f1,
Conditional Expression (1) is satisfied, which is represented by $$0.5 < |fT/f1| < 4 \qquad (1).$$

3. The variable magnification optical system according to claim 1,
wherein the first group remains stationary with respect to the image plane during changing magnification, and
assuming that a lateral magnification of the second group in a state in which an infinite distance object is in focus is β2, Conditional Expression (2) is satisfied, which is represented by $$-2<\beta2<-0.5 \tag{2}$$

4. The variable magnification optical system according to claim 1, wherein assuming that
a focal length of the third group is f3, and
a focal length of the fourth group is f4,
Conditional Expression (3) is satisfied, which is represented by $$-2<f3/f4<-0.1 \tag{3}$$

5. The variable magnification optical system according to claim 1, wherein assuming that
in a state in which an infinite distance object is in focus,
a lateral magnification of the third group at the telephoto end is β3T, and
a lateral magnification of the third group at the wide angle end is β3W,
Conditional Expression (4) is satisfied, which is represented by $$1<\beta3T/\beta3W<5 \tag{4}$$

6. The variable magnification optical system according to claim 1, wherein assuming that
in a state in which an infinite distance object is in focus,
a lateral magnification of the fourth group at the telephoto end is β4T, and
a lateral magnification of the fourth group at the wide angle end is β4W,
Conditional Expression (5) is satisfied, which is represented by $$1<\beta4T/\beta4W<5 \tag{5}$$

7. The variable magnification optical system according to claim 1, wherein assuming that
in a state in which an infinite distance object is in focus,
a lateral magnification of the third group at the telephoto end is β3T,
a lateral magnification of the third group at the wide angle end is β3W,
a lateral magnification of the fourth group at the telephoto end is β4T, and
a lateral magnification of the fourth group at the wide angle end is β4W,
Conditional Expression (6) is satisfied, which is represented by $$0.25<(\beta3T/\beta3W)/(\beta4T/\beta4W)<2 \tag{6}$$

8. The variable magnification optical system according to claim 1, wherein assuming that a lateral magnification of the fifth group at the wide angle end in a state in which an infinite distance object is in focus is β5W, Conditional Expression (7) is satisfied, which is represented by $$1<\beta5W<3 \tag{7}$$

9. The variable magnification optical system according to claim 1,
wherein the reflective surface of the first mirror and the reflective surface of the second mirror have spherical shapes, and
the first group includes at least one spherical lens in the optical path between the second mirror and the intermediate image.

10. A variable magnification optical system comprising: as groups having powers, only five groups consisting of, in order from an object side to an image side along an optical path, a first group that has a positive power, a second group that has a positive power, a third group that has a negative power, a fourth group that has a positive power, and a fifth group that has a positive power,
wherein the first group is an optical element that has a power positioned closest to the object side on the optical path, and includes a first mirror that has a concave reflective surface facing toward the object side and a second mirror that reflects light, which is directed from the first mirror toward the object side, toward the image side and that has a convex reflective surface facing toward the image side,
an intermediate image is formed in the optical path between the first group and the second group,
the second group, the third group, and the fourth group are refractive optical systems,
a stop is disposed between the third group and the fourth group,
during changing magnification from a wide angle end to a telephoto end, the first mirror, the second mirror, the second group, the stop, and the fifth group remain stationary with respect to an image plane, the third group moves to the image side, and the fourth group moves to the object side, and
assuming that
an average of partial dispersion ratios of all positive lenses in the second group between a g line and an F line is θgF2P, and
an average of partial dispersion ratios of all negative lenses in the second group between the g line and the F line is θgF2N,
Conditional Expression (8) is satisfied, which is represented by $$-0.15<\theta gF2P-\theta gF2N<-0.005 \tag{8}$$

11. The variable magnification optical system according to claim 1, wherein assuming that
an average of partial dispersion ratios of all positive lenses in the second group between a C line and a t line is θCt2P, and
an average of partial dispersion ratios of all negative lenses in the second group between the C line and the t line is θCt2N,
Conditional Expression (9) is satisfied, which is represented by $$0.01<\theta Ct2P-\theta Ct2N<0.3 \tag{9}$$

12. The variable magnification optical system according to claim 1, wherein assuming that
an average of partial dispersion ratios of all positive lenses in the fourth group between a g line and an F line is θgF4P, and
an average of partial dispersion ratios of all negative lenses in the fourth group between the g line and the F line is θgF4N,
Conditional Expression (10) is satisfied, which is represented by $$-0.15<\theta gF4P-\theta gF4N<-0.005 \tag{10}$$

13. The variable magnification optical system according to claim 1, wherein assuming that
an average of partial dispersion ratios of all positive lenses in the fourth group between a C line and a t line is θCt4P, and
an average of partial dispersion ratios of all negative lenses in the fourth group between the C line and the t line is θCt4N,
Conditional Expression (11) is satisfied, which is represented by $$0.01<θCt4P-θCt4N<0.3 \tag{11}$$

14. A variable magnification optical system comprising: as groups having powers, only five groups consisting of, in order from an object side to an image side along an optical path, a first group that has a positive power, a second group that has a positive power, a third group that has a negative power, a fourth group that has a positive power, and a fifth group that has a positive power,
wherein the first group is an optical element that has a power positioned closest to the object side on the optical path, and includes a first mirror that has a concave reflective surface facing toward the object side and a second mirror that reflects light, which is directed from the first mirror toward the object side, toward the image side and that has a convex reflective surface facing toward the image side,
an intermediate image is formed in the optical path between the first group and the second group,
the second group, the third group, and the fourth group are refractive optical systems,
a stop is disposed between the third group and the fourth group,
during changing magnification from a wide angle end to a telephoto end, the first mirror, the second mirror, the second group, the stop, and the fifth group remain stationary with respect to an image plane, the third group moves to the image side, and the fourth group moves to the object side,
the first group remains stationary with respect to the image plane during changing magnification, and
assuming that
a focal length of the variable magnification optical system at the telephoto end is fT, and
a focal length of the first group is f1,
Conditional Expression (1-1) is satisfied, which is represented by $$1<|fT/f1|<2.5 \tag{1-1}$$

15. The variable magnification optical system according to claim 3, wherein Conditional Expression (2-1) is satisfied, which is represented by $$-1.5<β2<-1 \tag{2-1}$$

16. The variable magnification optical system according to claim 4, wherein Conditional Expression (3-1) is satisfied, which is represented by $$-1<f3/f4<-0.5 \tag{3-1}$$

17. The variable magnification optical system according to claim 5, wherein Conditional Expression (4-1) is satisfied, which is represented by $$1.2<β3T/β3W<3.5 \tag{4-1}$$

18. The variable magnification optical system according to claim 6, wherein Conditional Expression (5-1) is satisfied, which is represented by $$1.2<β4T/β4W<3 \tag{5-1}$$

19. An imaging apparatus comprising the variable magnification optical system according to claim 1.

20. The variable magnification optical system according to claim 10,
wherein the first group remains stationary with respect to the image plane during changing magnification, and
assuming that
a focal length of the variable magnification optical system at the telephoto end is fT, and
a focal length of the first group is f1,
Conditional Expression (1) is satisfied, which is represented by $$0.5<|fT/f1|<4 \tag{1}$$

21. The variable magnification optical system according to claim 10, wherein the fourth group includes a biconvex lens that is disposed closest to the object side and a cemented lens that is disposed closer to the image side than the biconvex lens and formed by cementing two lenses including a positive lens and a negative lens.

22. The variable magnification optical system according to claim 10,
wherein the reflective surface of the first mirror and the reflective surface of the second mirror have spherical shapes, and
the first group includes at least one spherical lens in the optical path between the second mirror and the intermediate image.

23. The variable magnification optical system according to claim 14, wherein the fourth group includes a biconvex lens that is disposed closest to the object side and a cemented lens that is disposed closer to the image side than the biconvex lens and formed by cementing two lenses including a positive lens and a negative lens.

24. The variable magnification optical system according to claim 14,
wherein the reflective surface of the first mirror and the reflective surface of the second mirror have spherical shapes, and
the first group includes at least one spherical lens in the optical path between the second mirror and the intermediate image.

25. The variable magnification optical system according to claim 14, wherein assuming that
an average of partial dispersion ratios of all positive lenses in the second group between a g line and an F line is θgF2P, and
an average of partial dispersion ratios of all negative lenses in the second group between the g line and the F line is θgF2N,
Conditional Expression (8) is satisfied, which is represented by $$-0.15<θgF2P-θgF2N<-0.005 \tag{8}$$

26. The variable magnification optical system according to claim 14, wherein assuming that
an average of partial dispersion ratios of all positive lenses in the second group between a C line and a t line is θCt2P, and
an average of partial dispersion ratios of all negative lenses in the second group between the C line and the t line is θCt2N,
Conditional Expression (9) is satisfied, which is represented by $$0.01<θCt2P-θCt2N<0.3 \tag{9}$$

27. The variable magnification optical system according to claim 14, wherein assuming that an average of partial dispersion ratios of all positive lenses in the fourth group between a g line and an F line is θgF4P, and an average of partial dispersion ratios of all negative lenses in the fourth group between the g line and the F line is θgF4N, Conditional Expression (10) is satisfied, which is represented by $$-0.15 < \theta gF4P - \theta gF4N < -0.005 \quad (10).$$

28. The variable magnification optical system according to claim 14, wherein assuming that an average of partial dispersion ratios of all positive lenses in the fourth group between a C line and a t line is θCt4P, and an average of partial dispersion ratios of all negative lenses in the fourth group between the C line and the t line is θCt4N, Conditional Expression (11) is satisfied, which is represented by $$0.01 < \theta Ct4P - \theta Ct4N < 0.3 \quad (11).$$

* * * * *